US010581858B2

United States Patent
Fury Christ et al.

(10) Patent No.: US 10,581,858 B2
(45) Date of Patent: Mar. 3, 2020

(54) NETWORK ATTACHED STORAGE (NAS) APPARATUS HAVING REVERSIBLE PRIVACY SETTINGS FOR LOGICAL STORAGE AREA SHARES, AND METHODS OF CONFIGURING SAME

(71) Applicant: Datto, Inc., Norwalk, CT (US)

(72) Inventors: John Fury Christ, Norwalk, CT (US); Austin McChord, Norwalk, CT (US)

(73) Assignee: Datto, Inc., Norwalk, CT (US)

( * ) Notice: Subject to any disclaimer, the term of this patent is extended or adjusted under 35 U.S.C. 154(b) by 212 days.

(21) Appl. No.: 15/563,377

(22) PCT Filed: Apr. 1, 2016

(86) PCT No.: PCT/US2016/025765
§ 371 (c)(1),
(2) Date: Sep. 29, 2017

(87) PCT Pub. No.: WO2016/161396
PCT Pub. Date: Oct. 6, 2016

(65) Prior Publication Data
US 2018/0091517 A1 Mar. 29, 2018

Related U.S. Application Data

(60) Provisional application No. 62/141,455, filed on Apr. 1, 2015.

(51) Int. Cl.
*H04L 29/06* (2006.01)
*G06F 21/62* (2013.01)
(Continued)

(52) U.S. Cl.
CPC ............ *H04L 63/101* (2013.01); *G06F 3/067* (2013.01); *G06F 3/0622* (2013.01);
(Continued)

(58) Field of Classification Search
CPC . H04L 67/1097; H04L 63/101; H04L 63/104; H04L 63/105; G06F 21/6209;
(Continued)

(56) References Cited

U.S. PATENT DOCUMENTS

2007/0233985 A1* 10/2007 Malhotra .............. G06F 3/0605
711/163
2008/0281967 A1 11/2008 Muhlestein et al.
(Continued)

OTHER PUBLICATIONS

International Search Report and Written Opinion for PCT Application No. PCT/US2016/025765 dated Aug. 26, 2016 (14 pages).

*Primary Examiner* — Thaddeus J Plecha
(74) *Attorney, Agent, or Firm* — Fay Sharpe LLP

(57) ABSTRACT

A Network Attached Storage (NAS) apparatus to provide network-based data storage for client computing devices (e.g., in a local area network). One or more file-based logical storage area (LSA) shares are created in memory of the NAS apparatus, wherein each file-based LSA share originally is configured as one of "private access" (only certain users have access to a private file-based LSA share) or "public access" (any user on the LAN that can access the NAS appliance can also access the public file-based LSA share). At some later time, the file-based LSA share may be reconfigured to go from private-to-public access or public-to-private access (each file-based LSA share has a "reversible privacy setting"). In one example, object permissions for each object (file or folder) already stored on the LSA share prior to the access reconfiguration are updated on an object-by-object basis to ensure appropriate access to all legacy objects after the access reconfiguration.

17 Claims, 22 Drawing Sheets

(51) Int. Cl.
*G06F 3/06* (2006.01)
*H04L 29/08* (2006.01)

(52) U.S. Cl.
CPC ........ *G06F 3/0659* (2013.01); *G06F 21/6209* (2013.01); *G06F 21/6218* (2013.01); *G06F 21/6236* (2013.01); *H04L 63/104* (2013.01); *H04L 63/105* (2013.01); *G06F 2221/2113* (2013.01); *G06F 2221/2141* (2013.01); *H04L 67/1097* (2013.01)

(58) Field of Classification Search
CPC ............. G06F 21/6218; G06F 21/6236; G06F 2221/2113; G06F 2221/2141
See application file for complete search history.

(56) References Cited

U.S. PATENT DOCUMENTS

| | | |
|---|---|---|
| 2010/0235396 A1 | 9/2010 | Chaurasia et al. |
| 2010/0242083 A1 | 9/2010 | Begum et al. |
| 2010/0299362 A1* | 11/2010 | Osmond ............. G06F 21/6218 707/781 |
| 2014/0279893 A1 | 9/2014 | Branton |
| 2015/0033224 A1* | 1/2015 | Maheshwari ........... G06F 3/067 718/1 |

\* cited by examiner

FIG. 2C

Create Share

1. New Share  2. Settings  3. Scheduling  4. Retention  5. Complete nasShare Share Settings — 309

Share Access: ● Private  ○ Public

*Private:* Only selected users can access this share.

*Public:* Makes this share available with full read, write, and overwrite permissions for all users with access to the local subset.

File / Folder Access: ○ Enable write Access for all users

By default, a private share allows aonly the creator of a file or folder to modify it. Checking this box lets all users with access to the share write to add files and folders.

Users: ● client A, ○ client B, ● client C, ○ dalto  — 311

Select the users that can access this private share.

Other Options: ○ Enable NPS, ○ Enable FIA, ○ Enable AFP — 312

*NFS:* Allows

*FTP:* File Transfer Protocol

*AFP:* Apple Filling Protocol is a proprietary network protocol

[Next] ← 314

| From | To | New Objects | Existing Objects |
|---|---|---|---|
| Public | Private | Restrict LSA share access to only selected private share users, and assign WACO permissions to each new object created on the LSA share | No change |
| Private | Public | Allow LSA share access to all authorized LAN users, and assign WAA permissions to each new object created on the LSA share | For each existing object stored on the LSA share, update object permissions to WAA permissions |
| N set of users with WAA access | (N-X) set of users with WAA access | For any new file in the file share assign WACO permissions to the members of the (N-X) set of users | No change |
| (N-X) set of users with WAA access | N set of users with WAA access | For any new file in the file share assign WAA permissions to the members of the N set of users | For every existing file in the file share assign WAA permissions to the members of the X set of users |

EXAMPLE OF RULES IN SOME EMBODIMENTS

| | From | To | New Objects | Existing Objects |
|---|---|---|---|---|
| In a Private Share | WACO | WAA | Assign WAA permissions to each new object created on the LSA share, for all private share users | For each existing object stored on the LSA share, update object permissions to WAA permissions |
| | WAA | WACO | Assign WACO permissions to each new object created on the LSA share, for all private share users | No change |

FIG. 8B

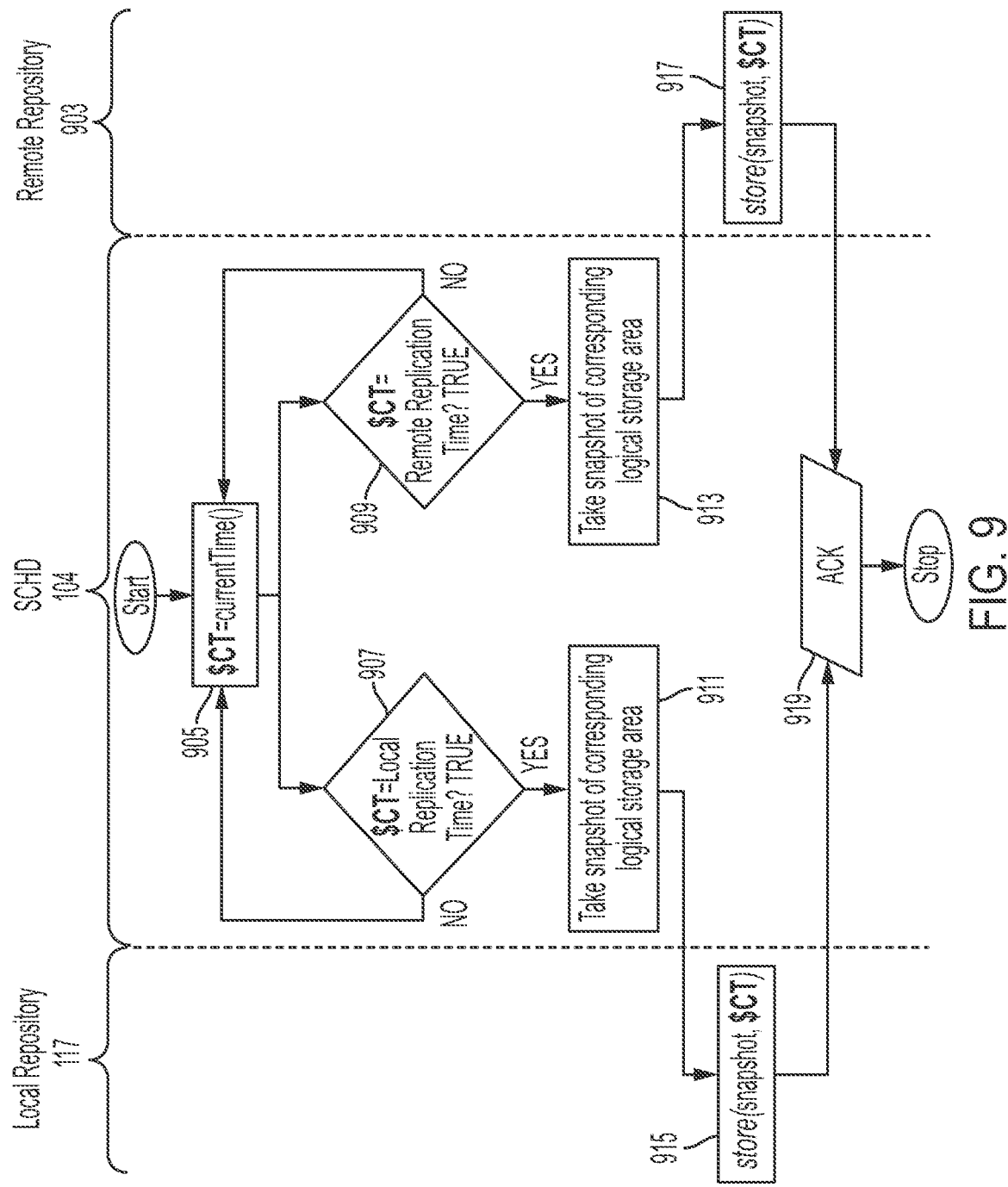

NETWORK ATTACHED STORAGE (NAS) APPARATUS HAVING REVERSIBLE PRIVACY SETTINGS FOR LOGICAL STORAGE AREA SHARES, AND METHODS OF CONFIGURING SAME

CROSS-REFERENCES TO RELATED APPLICATIONS

This application is a National Stage Application under 35 U.S.C. 317 of International Application No. PCT/US2016/025765 filed Apr. 1, 2016, entitled "NETWORK ATTACHED STORAGE (NAS) APPARATUS HAVING REVERSIBLE PRIVACY SETTINGS FOR LOGICAL STORAGE AREA SHARES, AND METHODS OF CONFIGURING SAME," which claims the benefit of priority to U.S. Provisional Application Ser. No. 62/141,455, filed Apr. 1, 2015, entitled "APPARATUSES, METHODS, AND SYSTEMS FOR PRESERVING DATA AND DATA ACCESS PRIVILEGES IN A CROSS-PLATFORM CLIENT SERVER," each of which is hereby incorporated by reference herein in its entirety.

BACKGROUND

A Network Attached Storage (NAS) System can enable multiple computers to share the same storage space at once, minimizing overhead by centrally managing storage devices. A NAS may comprise one or more storage disks, Ethernet connectivity, and an operating system. For instance, a NAS can include a UNIX/Linux operating system (OS) to manage one or more hard disk drives that can be arranged into logical, redundant repositories or Redundant Arrays of Independent Disks (RAID). Moreover, a NAS can provide client services in one or more file transfer protocols including NFS (popular on UNIX systems), SMB/CIFS (Server Message Block/Common Internet File System) (used with MS Windows systems), AFP (used with Apple Macintosh computers), or NCP (used with OES and Novell NetWare).

Communication with a NAS can occur over Transmission Control Protocol/Internet Protocol (TCP/IP). More specifically, client computing devices can utilize any of several higher-level protocols built on top of TCP/IP.

A NAS can provide several advantages over a general-purpose servers including but not limited to faster data access, easier administration, and simple configuration. A NAS can remove the responsibility of file serving from other servers on the network. Additionally, a NAS can be added to a network when more hardware space is desired without shutting down the servers for maintenance or upgrades. As a result, a NAS can reduce the costs associated with a file server. For example, a NAS can have its own embedded operating system running in simplified hardware, so there is no need to invest in a full-featured network operating system and/or general-purpose computer hardware.

There is often a business need to access data that resides on NAS devices from cross-platform client computing devices running different operating systems. The most common examples include client computing devices running Windows, UNIX based OS and OS X. Samba is a client/server technology that implements network resource sharing across operating systems. A NAS can implement Samba services to make UNIX/LINUX logical storage area shares to Windows client computing devices through the operating system browsers such as Windows Explorer, Network Neighborhood, and Internet Explorer.

Logical storage area shares can be configured in a NAS with a variety of access level permissions to users, group or users or users associated with a domain name. Similarly, specific operating systems can have particular methods to manage access level permissions. For example, Windows OS can rely on Access Control List (ACL) with Access Control Entries (ACE). Each ACE in an ACL can identify a user and specific access rights allowed, denied or audited for that user.

Conventional NAS are limited in the way access control lists are managed from a NAS to the network clients in cross-platform networks. For example, when the operating system running a conventional NAS is different from the operating system in one or more client terminals, client permissions changes performed in the conventional NAS with respect to logical storage areas, file shares and/or digital objects may not be accommodated or supported over all the cross-platform client terminals. Different platforms can exhibit slightly different behaviors, endemic bugs, or glitches, all of which restrict developers to perform only the lowest common denominator subset of features. Conversely, the NAS disclosed here can include specialized hardware and software components that enable a comprehensive spectrum of client permission operations in cross-platform networks, including granting and subsequently modifying client permissions over file shares, folders, and files.

SUMMARY

Various embodiments of the present invention are directed to a Network Attached Storage (NAS) apparatus to provide network-based data storage for client computing devices (e.g., in a local area network or "LAN"). One or more file-based logical storage area (LSA) "shares" are created in memory of the NAS apparatus, wherein each file-based LSA share originally may be configured as one of "private access" (only certain users have access to a private file-based LSA share) or "public access" (any user on the LAN that can access the NAS appliance can also access the public file-based LSA share). At some later time, the file-based share may be reconfigured to go from private-to-public or public-to-private access (each file-based LSA share has a "reversible privacy setting").

Each object (i.e., a file or folder/directory) created in a file-based LSA share in memory of the NAS apparatus is associated with an "access control list" (ACL) that specifies "object permissions," i.e., permitted operations on the object (e.g., a read operation, a write operation, an execute operation) for each user with access to the LSA share. For public shares, any user with access to the LAN has access to all objects on the share, and each object is associated with object permissions that permit read, write, and execute operations (e.g., traditional UNIX permissions of "0777" in octal notation). For private shares, specific users ("private share users") are given access to the share (e.g., provided with some authentication credentials such as a username and password, provided by a NAS administrator). In one embodiment, by default an object created by a private share user has object permissions set to "Write Access Creator Only" (WACO) (e.g., traditional Unix permissions of "0755" in octal notation); i.e., only a creator of the object stored in the private file-based LSA share has write operation permission. As an alternative, the private file-based LSA share may be configured as "write access for all" (WAA), such that all objects stored on the share have an ACL that specifies object permissions that permit read, write, and execute operations (e.g., traditional Unix permissions of "0777") for all of the private share users.

In one implementation, the NAS apparatus runs a Unix-like operating system (e.g., Linux) and a Samba network file system protocol to provide file and print services for client computing devices in the local area network (LAN). In turn, respective client computing devices accessing the NAS apparatus may be running a Windows operating system (or other operating systems such as a Mac operating system or a Linux operating system).

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIGS. 2A-2D show respective Graphical User Interfaces (GUIs), provided by the NAS apparatus of FIG. 1A, to allow for login by a NAS administrator, entry of local users on the LAN, and provide an overview of information about the NAS apparatus, according to one inventive embodiment.

FIGS. 3A-3D show additional respective GUIs, provided by the NAS apparatus of FIG. 1A, to facilitate creation in memory of the NAS apparatus of a logical storage area (LSA) share with particular privacy settings, according to one inventive embodiment.

FIG. 8A shows an example rule set for reconfiguring an LSA share of the NAS apparatus of FIG. 1A according to one inventive embodiment.

FIG. 8B shows an example rule set for a private LSA share of the NAS apparatus of FIG. 1A, according to one inventive embodiment.

FIG. 9 shows an example data flow illustrating aspects of a scheduler daemon (e.g., implemented pursuant to an examplary Scheduler (SCHD) Component) for local and remote replication of at least one LSA share of the NAS apparatus of FIG. 1A, according to one inventive embodiment.

DETAILED DESCRIPTION

Figure 1A:
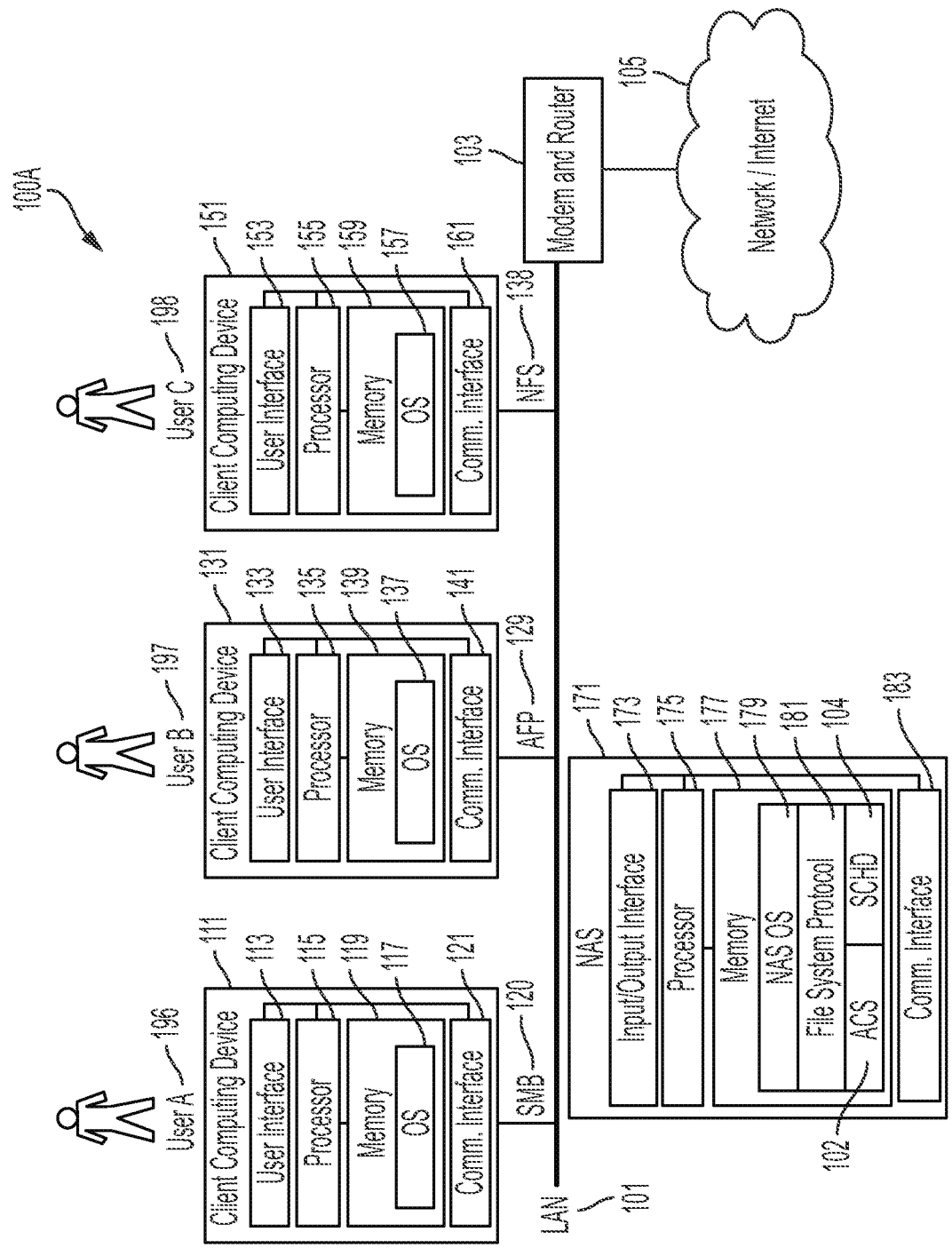
FIG. 1A shows a NAS apparatus connected via a local area network (LAN) to multiple client computing devices, according to one inventive embodiment.

Following below are more detailed descriptions of various concepts related to, and embodiments of, inventive network attached storage apparatus having reversible privacy settings for logical storage area shares, and methods of configuration of same. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

Embodiments of the present disclosure relate to the configuration and reconfiguration of "local storage area shares" (also referred to herein as LSAs) in a NAS apparatus, including privacy settings associated with one or more LSAs with respect to the access level the users of the NAS can obtain over the LSAs or the digital objects stored in an LSA. Examples of hardware include a NAS that can be coupled to a computer network to provide users with the capability of sharing folders, files and/or executable software. The NAS provides software and hardware components to configure, enforce, and modify client permissions, not only at the file share level, but also at the digital object level. For example, the NAS can enable configuration, enforcement, and modification of permissions associated with a folder, file, and/or executable software. Moreover, the NAS can be equipped with hardware and software that enables content synchronization with a remote repository, such that a current version of the NAS content can be retrieved from the remote repository and/or cloud when desired. For example, the NAS content can be restored from a replica stored in the remote repository after a failure of a LSA, the NAS itself and similar types of failures.

Other aspects the NAS disclosed herein include specialized hardware and software components configured to perform continuous and/or on-demand snapshots and content synchronization with local and remote repositories. The NAS content can be stored redundantly in more than one repository at the memory block level for rapid failback recovery after a failover. Additionally, the NAS enables a user to specify one or more backup schedules for performing local backups and offsite synchronization. Backup schedules can run on the NAS during protection hours when changes are being made to protected machines capturing new updates and/or new information.

The NAS can also enable a user to configure one or more backup retention policies. These policies can specify how long a device should maintain local and offsite backup files or snapshots, which in turn enables users to manage available space in their local devices and cloud space. By managing available local and cloud storage space, a user can mitigate tradeoffs between data protection and memory space.

For example, a retention policy can specify local and/or offsite retention for 2 days, 2 weeks, or 31 days, depending on the available storage space and the desired tradeoff between data protection and memory space.

NAS Network Architecture

FIG. 1A is a schematic illustration of a NAS connected via a local area network (LAN) to multiple client computing devices, each client computing device can be operated by a different user, the NAS and the client computing devices can have access to the Internet through a modem and router. FIG. 1A illustrates a NAS 171 connected to client computing devices 111, 131, 151, and modem and router 103, but it should be understood that the NAS can use a set of any number of servers and/or other compute devices, including servers and computing devices not shown in FIG. 1A. The client computing devices can access the NAS over the LAN using multiple file system protocols. For ease of understanding, each of client computing devices 111, 131, 151, and 185, associated with users 196-199 respectively in FIG. 1A and FIG. 1B, described below, are described only with respect to client computing device 111 such that descriptions for one component of client computing device 111 correspond with similarly labeled components of client computing devices 131, 151, and 185 (e.g. user interface 113 corresponds to user interfaces 133, 153, and 187; processor 115 corresponds to processors 135, 155 and 189; memory 119 corresponds to memories 139, 159 and 192; OS 117 corresponds to operating systems 137, 157 and 190; and communication interface 121 corresponds to communication interfaces 141, 161 and 195). Client computing device 111 includes user interface 113, processor 115, memory 119, OS 117 and communication interface 121.

The NAS 171 can include a processor 175 coupled to a memory 177, a communication interface 183, and an input/output interface 173. The memory 177 can be, for example, any of a random access memory (RAM), a memory buffer, a hard drive, a database, an erasable programmable read-only memory (EPROM), an electrically erasable read-only memory (EEPROM), a read-only memory (ROM) a virtual memory implemented in a virtual machine, a storage array including any number of hard disk drives (HDDs) and/or so forth.

In some instances, the memory 177 stores instructions to cause the processor to execute modules, processes and/or functions of the NAS operating system (OS) 179 to perform, for example, access control of logical storage areas distributed across the memory 177, and implement one or more file system protocols 181 for sharing LSAs, files, and similar digital objects among the users of the NAS. The transmission and reception of data between the client computing devices and the NAS can be performed through the communication interface 183 across the LAN 101.

The memory 177 can be configured to store one or more logical area (LSA) components, and one or more retained snapshots and/or backup file versions of one or more logical storage areas, directory structures, and digital objects (not shown in FIG. 1A). In some instances, LSAs can be configured as file systems. For example, a Samba network file system can be configured providing interoperable file and print services between client computing devices running Linux-based operating systems and Windows-based operating systems. Alternatively, an LSA can be set to for block storage, for example, by setting an Internet Small Computer System Interface (iSCSI). An iSCSI share follows a networking protocol which, when working in conjunction with an iSCSI target and an iSCSI initiator, provides shareable block storage over a network.

Memory blocks (MB) can contain digital objects for example files directories and/or data memory blocks. Some accessible by the user, some used by the file system for various functions, e.g. security and directories. One way to view a MB is as a volume and the digital objects as text. A copy of the volume containing the digital text is stored as retained versions of the volumes.

In some instances, the memory 177 can include a database component, or any other type of digital data structure to store records. Some of the records stored in such a database or digital data structure can include NAS users, groups of users, privacy settings and/or user permissions and privileges over LSAs, and items or digital objects stored in the LSAs.

In some instances, the NAS database or digital structure can comprise data records establishing logical relations between users and logical storage areas and/or digital objects stored in the logical storage areas (e.g., 119) such logical relationships can be established through the user interface component 113. Moreover, the logical relations may be queried and/or accessed by other NAS components. For example, the ACS Component 102 can query an NAS Database Component to determine if a user and/or group of users have permissions over one or more LSAs 119 and/or digital objects 449 residing in an LSA 119.

Figure 1B:
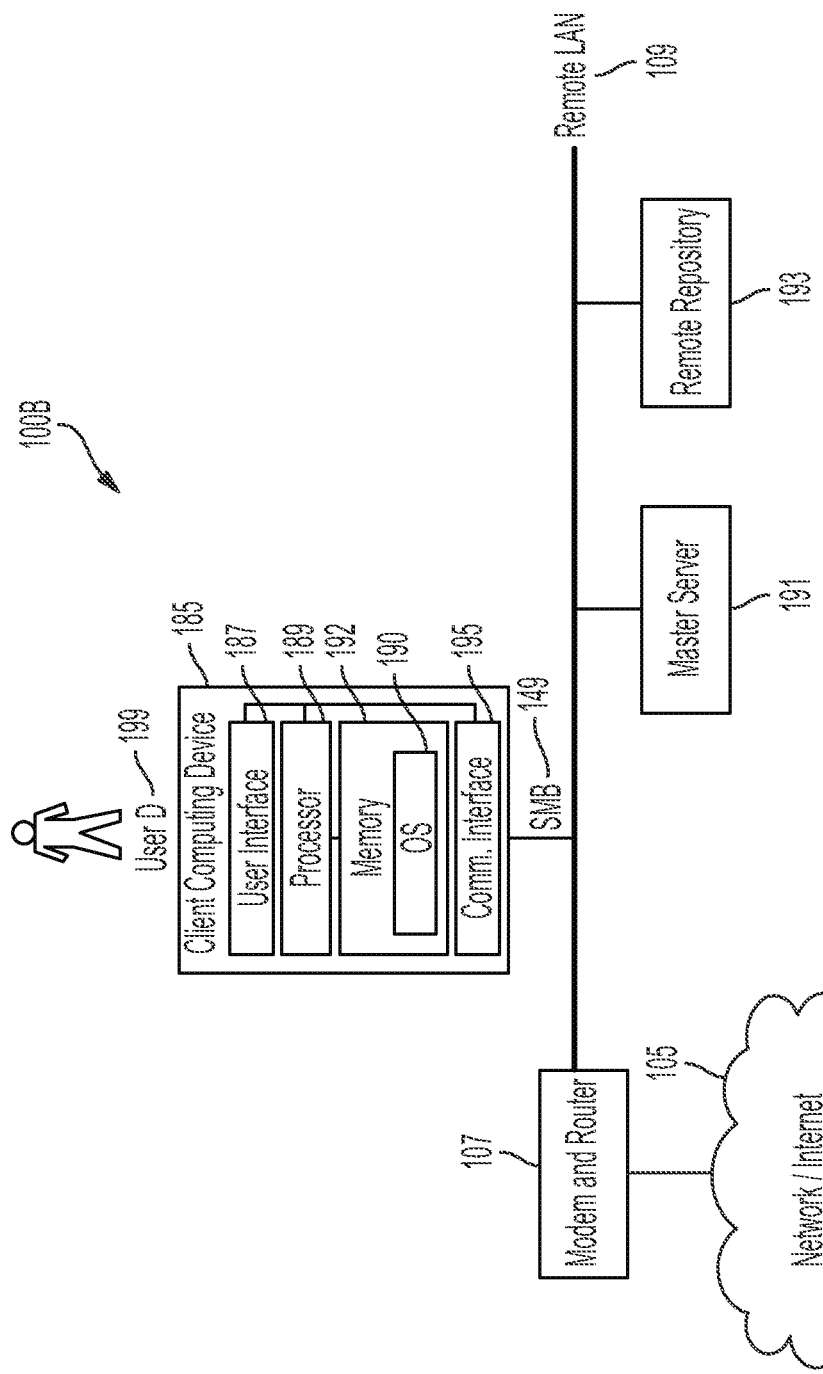
FIG. 1B shows a remote LAN that has access to the NAS apparatus of FIG. 1A via the Internet, according to one inventive embodiment.

FIG. 1B is a schematic illustration of a remote LAN connecting a client computing device operated by a remote user, a master server, a remote repository, and a modem and router. The devices connected in the remote LAN can transmit and receive information from the NAS in FIG. 1A via a modem and router connected to the Internet.

The NAS 171 provides logical storage area sharing services to one or more client computing devices in a local area network 101. The logical storage areas residing in the NAS 171 can be configured to provide one or more file services to client terminals, for example, Network File System (NFS) services (e.g., NFS 138), File Transfer Protocol (FTP) services, Apple Filing Protocol (AFP) services (e.g., AFP 129), World Wide Web Distributed Authoring and Versioning (WebDAV) services, Server Message Block (SMB) services (e.g., SMB 120, 149), Z file system services, and the like services. In some embodiments, the logical storage areas can be configured as block-level storage (for example, as an Internet Small Computer System Interface (iSCSI)

acting as a physical drive directly attached to a computer). Moreover, the NAS 171 can store in the memory 177 snapshots and/or backup files according to a default or at a user specified time schedule. Such a time schedule can be monitored by a master server 191 by validating and/or approving a replication or synchronization transaction request comprising a time, a pairing contract vector comprising a virtual block device indicator corresponding to a logical storage area, and a replication relationship between the logical storage area and a remote storage device. The synchronization transaction request can be sent to the master server 191 every time a scheduler component in the NAS 100 (e.g., NAS 100A, 100B) fires a time-based synchronization event.

The NAS can be connected to one or more remote systems (e.g., Remote LAN 109) through a Metropolitan Area Network (MAN) (not shown in FIG. 1A), a Wide Area Network (WAN) 105, an enterprise Intranet network (not shown in FIG. 1A), and/or the Internet. For example, the NAS 100 can replicate snapshots, back up files, and/or synchronize logical storage area content with a remote repository 193 according to a default or at a user specified time schedule. Such a time schedule can be monitored by the master server 191 by validating and/or approving a replication or synchronization transaction request comprising a time, a pairing contract vector further comprising a virtual block device indicator corresponding to a logical storage area, and a replication relationship between the logical storage area and a remote storage device. The synchronization transaction request can be sent to the master server 191 every time a scheduler component in the NAS 100 fires a time-based synchronization event.

In some embodiments, the NAS 100 can be enabled to performed information server functionality for example, providing regulated logical storage area access to one or more remote client terminals.

NAS User Interface

Figure 2A:
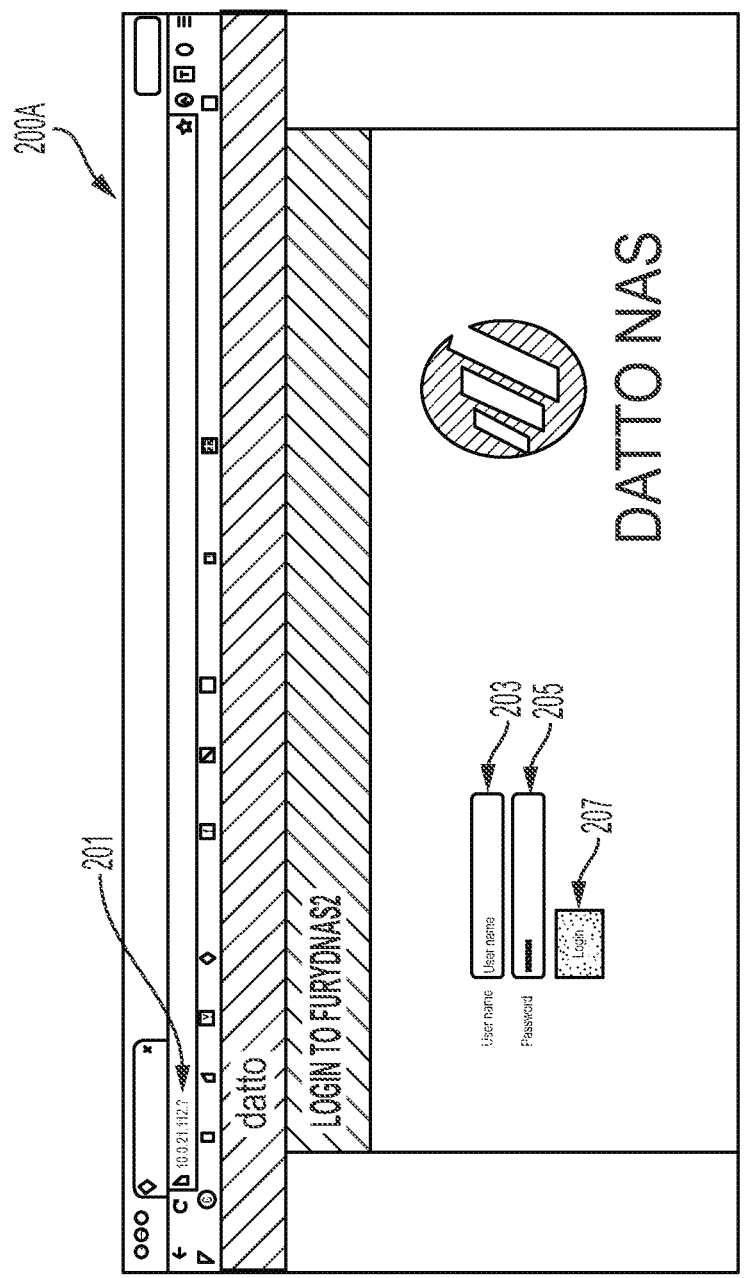
Figure 2B:
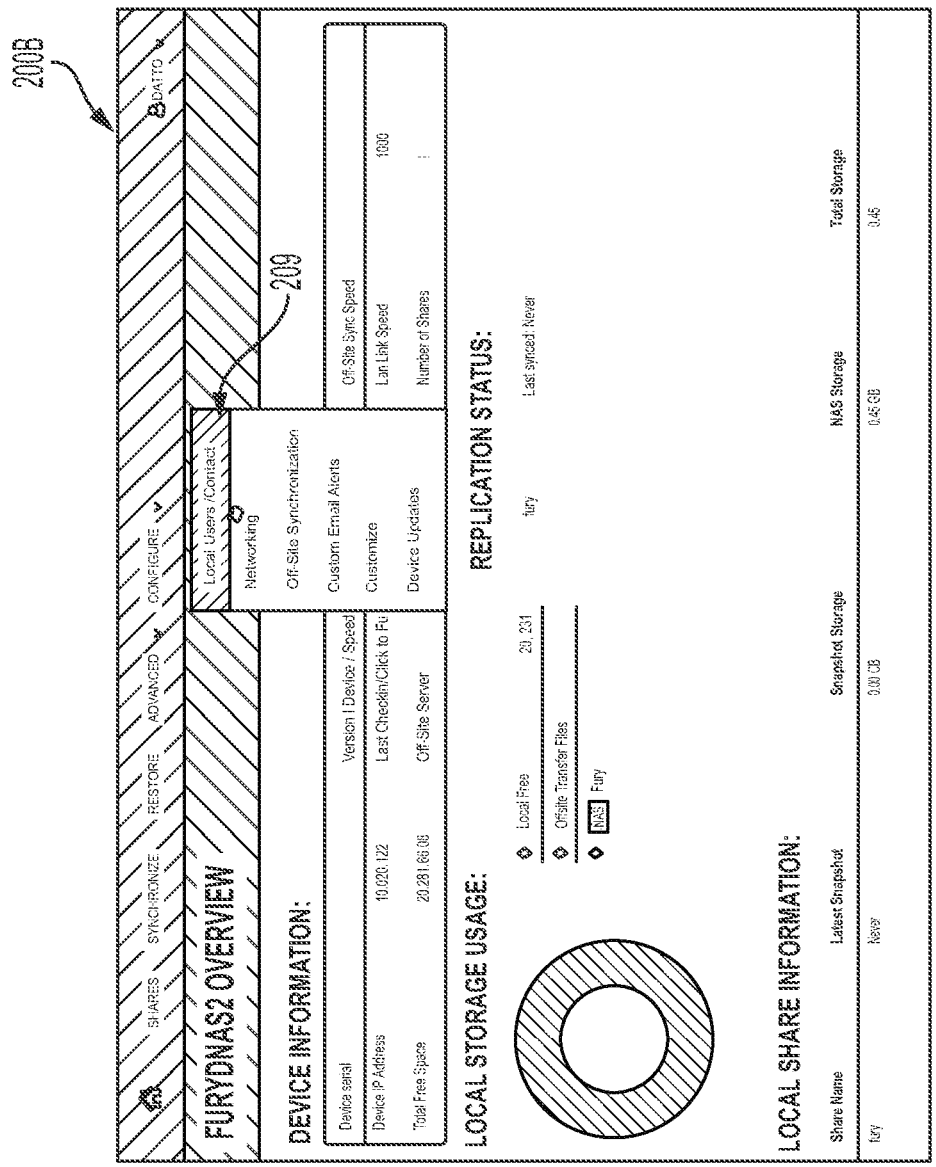
Figure 2C:
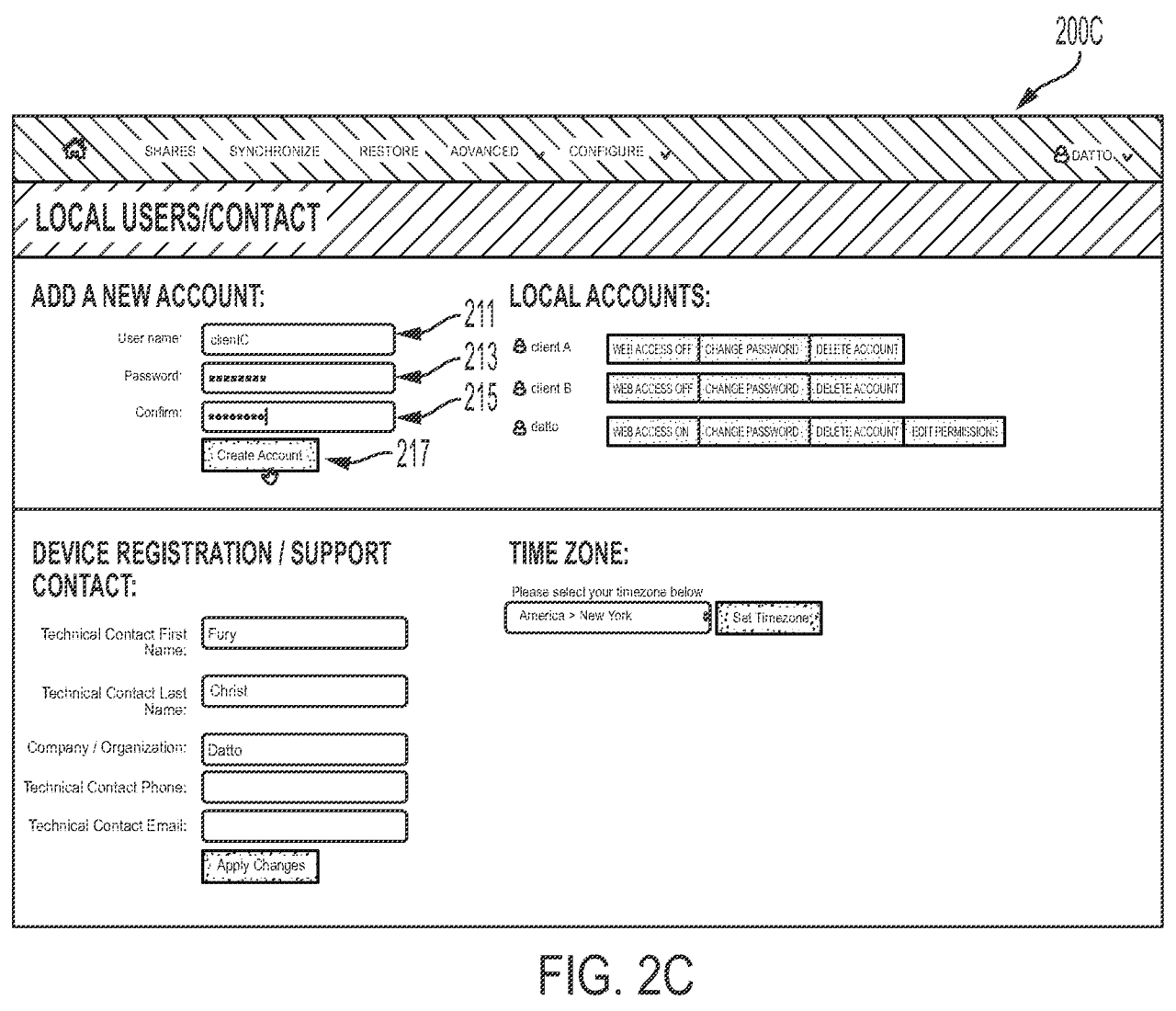
Figure 2D:
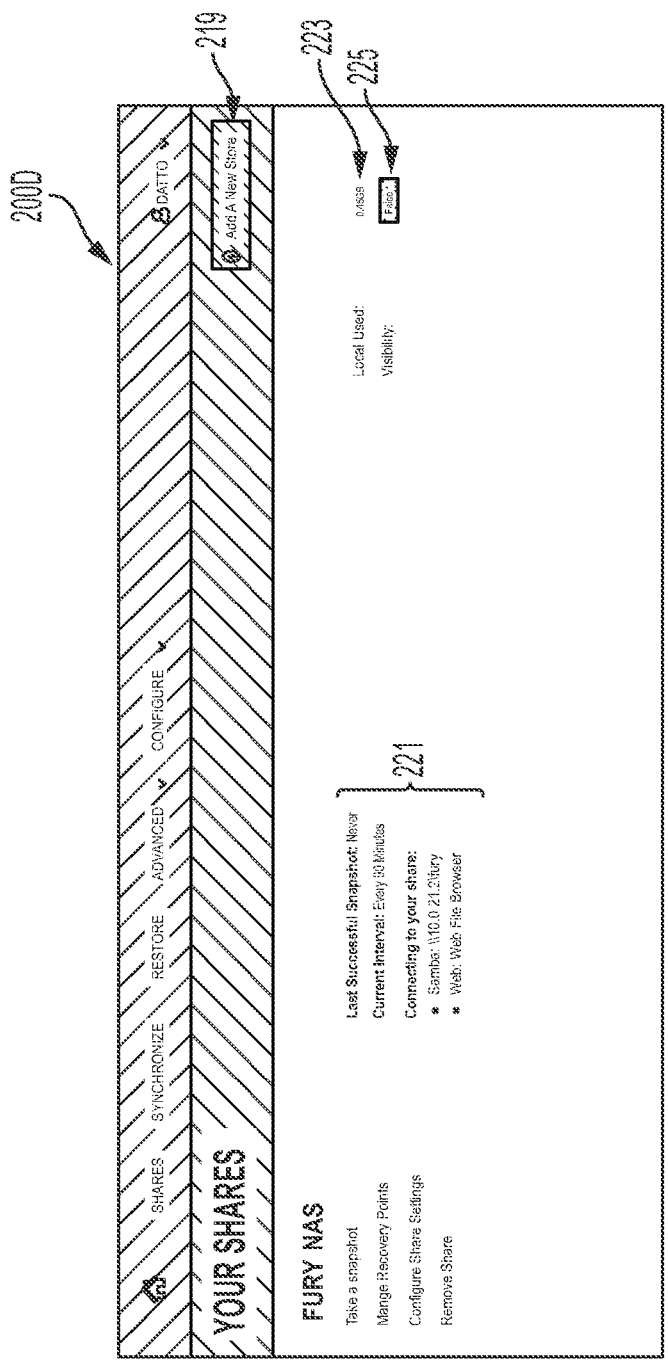

FIGS. 2A-D show a Graphical User Interface (GUI) to configure user accounts and domains (LSA) in the NAS. FIG. 2A shows a section of a GUI to establish a connection. For example, a user can enter an Internet Protocol (IP) address 201 or other unique identifier to display the GUI section 200A. The GUI section 200A can have fields to enter a username 203 and unique password 205. Thereafter, a user can press the login button 207 to display the next GUI section 200B.

The GUI section 200B shows a dropdown menu where a user can select among different menu options including the menu option local users/contact 209 highlighted in GUI section 200B.

In some instances, when a user selects the menu option 209 the GUI section 200C can be displayed. The GUI section 200C shows an area where a user can add a new user account for the NAS 100 by entering a user name 211, a password 213 for the new user and confirming the entered password 215. Thereafter, the user can pressed the create account button 217 to move to the GUI section 200D.

GUI section 200D shows area 221 displaying information regarding the logical storage area, for example, the time when the last successful snapshot was taken, how often a snapshot was configured to be taken, the current memory used 223 and the type of access level 225 the share was configured to have, in this example the share is public however other access levels can be provided, for example private. A user can add a new share 219 by pressing the button 219.

Figure 3A:
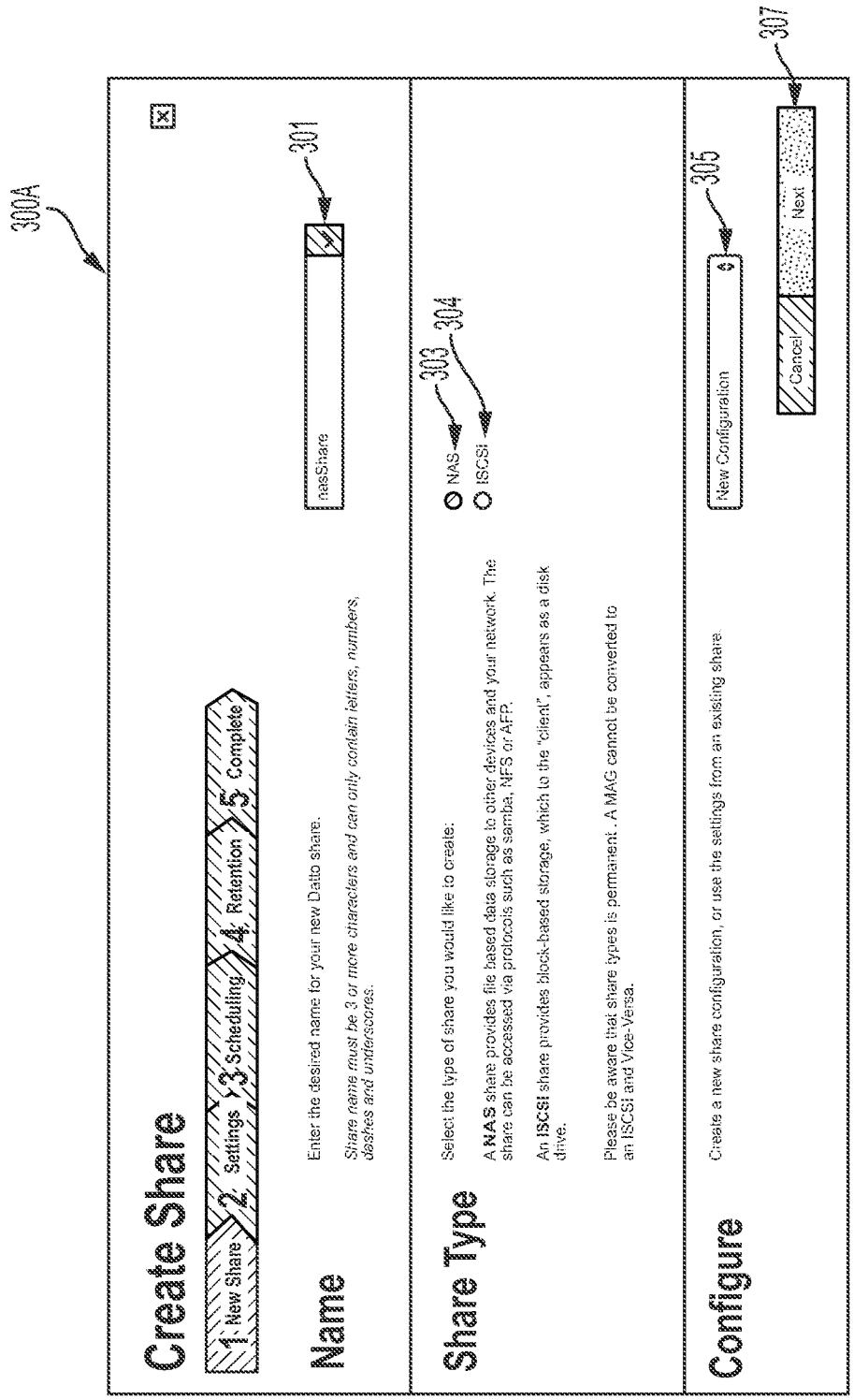

FIGS. 3A-3E show different sections of a GUI to configure a logical storage area (LSA), including LSA privacy settings in the NAS. In particular, FIG. 3A shows a GUI section 300A that enables a user to create a logical storage area and/or shared memory space (share). A user can name a new logical storage area and/or share through the text box 301.

In some embodiments, one or more radio buttons and or the like selectors (e.g., 303 and 304) can be comprised in the GUI section 300A enabling a user to select a type of logical storage area and/or share. In one embodiment of the NAS 100 a user can create a Network Attached Storage (NAS) share which can provide file-based data storage to one or more client terminals. A NAS share can be accessed through one or more protocols, for example, Network File System (NFS) services, File Transfer Protocol (FTP) services, Apple Filing Protocol (AFP) services, Server Message Block (SMB) services. In a further embodiment, a user can create an iSCSI share for block-based storage by selecting the corresponding iSCSI radio button 304. In some embodiment, an iSCSI storage can be viewed and function as a disk drive from a client terminal. Additionally, a user can create a share utilizing a previously set configuration through drop box menu 305, for example, a saved configuration specifying a group of user and/or a file system protocol. Alternatively, the user can specify a new share configuration through the drop box menu 305 including but not limited to access settings, users settings, file server settings, snapshot and/or backup schedules, offsite and/or local synchronization, local and remote retention policy settings. A user can press the next button 307 to continue configuring a logical storage area.

FIG. 3B shows an example screenshot of a GUI section 300B provided by the NAS. In some embodiments, a GUI section 300B enables a user to create a logical storage area as a private 309 or public share by selecting a corresponding share access radio button. Logical storage areas configured as a public share can be browsed with read write and execute permissions for all users with access to a local subnet. A logical storage area configured as a private share as shown in the GUI section 300B can restrict one or more permissions to a selected group of users including read, write, and/or execute permissions. In some embodiments, the GUI section 300B can enable a user to configure permissions to a file, folder, and/or other digital object or item residing in a share. For example, the checkboxes 311 can be marked to grant one or more permissions over a file, digital object and/or folder contained in a logical storage area. Some examples of the permissions that can be granted at the file and/or folder level include read, write and/or execution permissions.

In some embodiments, a user can specify a user and/or a group of users to provide them access to a share. For example, a user can check some or all the checkboxes 311 to provide permissions to a user and/or group of users. In some further embodiments, a user can select one or more protocol services 312. For example, a user can select a checkbox to enable NFS services to provide access to systems not running on Windows operating system for example Linux and/or Apple systems. Similarly, FTP services can be enabled for transferring files and/or digital objects. In some embodiments, when a logical storage area is configured as a private share, only the user or group of users with a marked checkbox 311 may have access to FTP services. In some further embodiments, when a logical storage area is configured as a public share all users with access to a local subnet may have anonymous access to FTP services. Additionally or alternatively, the user can enable AFP services to perform backups on Apple systems. The user can press the next button 314 to continue configuring a logical storage area.

Figure 3C:
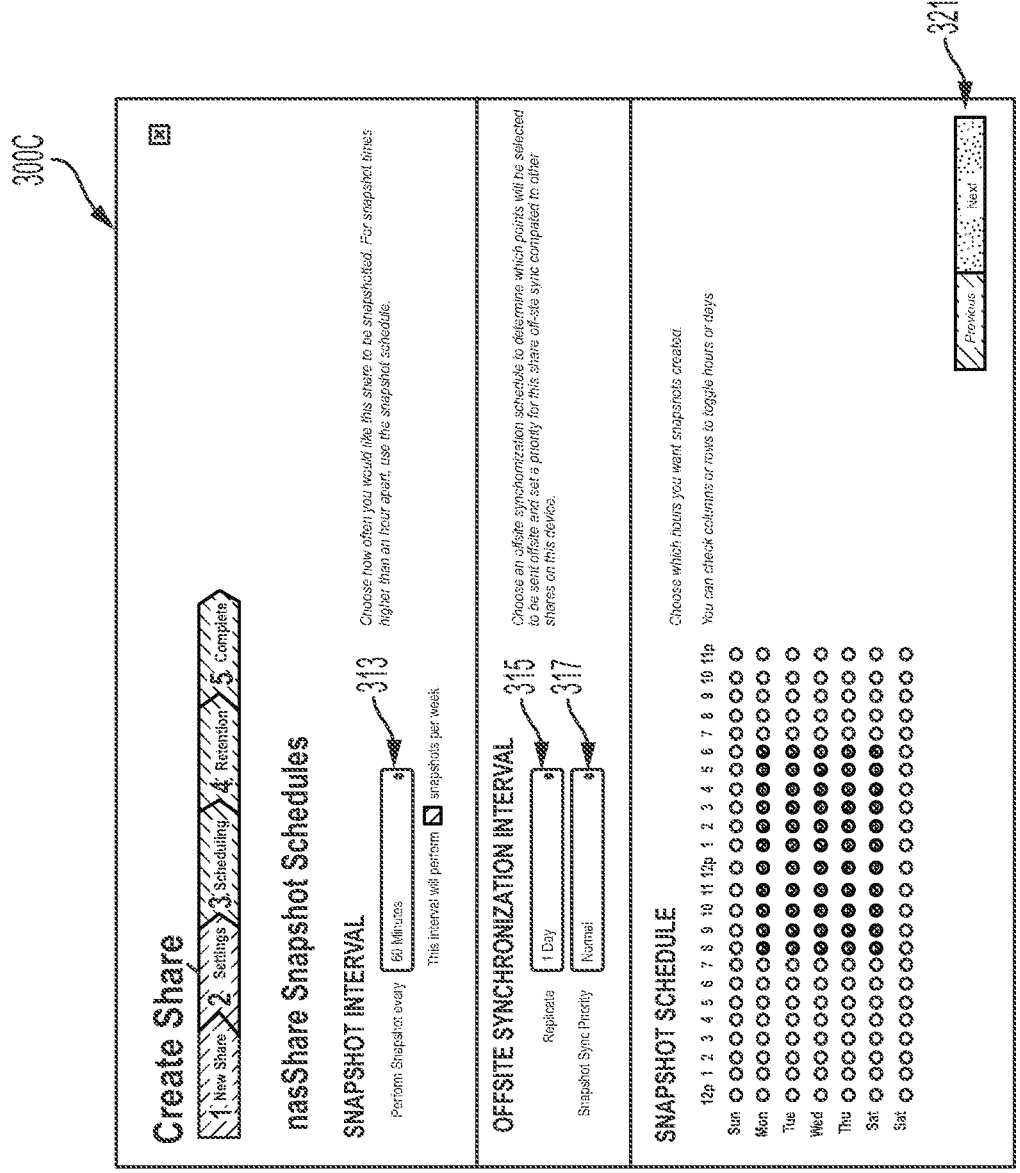

FIG. 3C shows an example screenshot of a GUI section 300C provided by the NAS. In some embodiments a GUI section 300C can enable a snapshot interval dropdown menu for a user to specify a time interval 313 utilized by the NAS to take a snapshot of a created share. The snapshots generated at the interval time specified in 313 can be stored locally. Additionally, a user can specify an offsite synchronization interval and/or replication interval 315. A user can utilize the offsite synchronization schedule to determine which point will be selected to be sent offsite, for example, to a remote repository. Moreover, the GUI section 300C can also comprise a dropdown menu for the user to specify a snapshot synchronization priority 317. For example, if a share has normal priority it could be, in some instances, be preempted from offsite synchronization if at the same time another share with a higher priority is supposed to be synchronized. After the higher priority share has been synchronized, then the share having lesser priority can be synchronized.

In some embodiments, a user can utilize a snapshot schedule 319 to specify snapshot times further than an hour apart. A column and row arrangement is provided where a user can specify snapshot times based on selected weekdays and hours. The user can press the next button 321 to continue configuring a logical storage area.

Figure 3D:
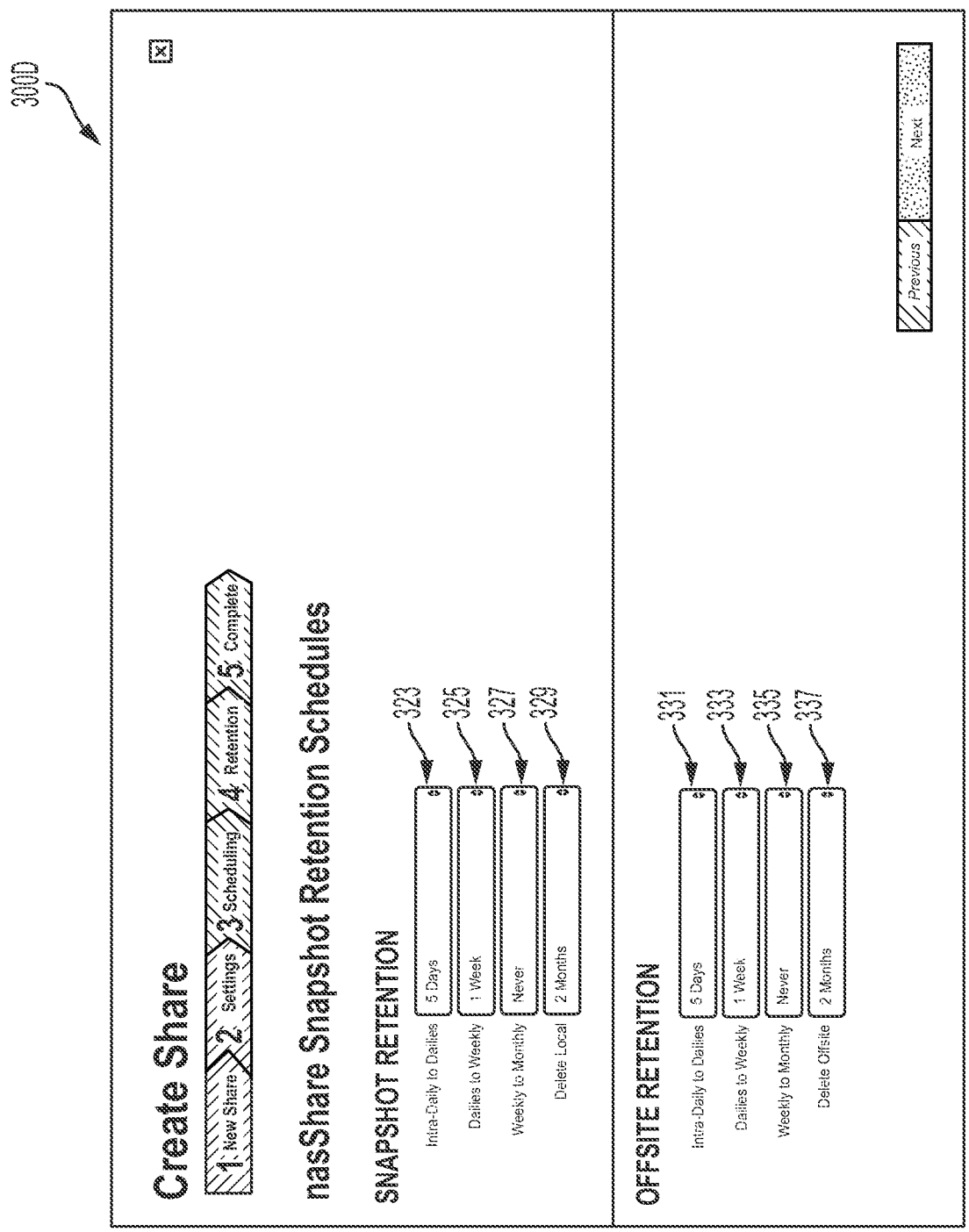

FIG. 3D shows an example screenshot of a GUI section 300D provided by the NAS. In some embodiments, a GUI section 300D can enable a user to specify local and offsite retention policies. In some embodiments, a snapshot can be rolled-up based on a retention schedule set by a user saving memory space and reducing unnecessary data redundancy, as less granularity of recovery points is needed over time.

The snapshot retention policy enables a user to define how long a NAS device will maintain local snapshots for the created share. The policy can comprise intra-daily to dailies intervals 323, dailies to weekly intervals 325, weeklies to monthly intervals 327, and delete local policies 329.

Additionally, in some embodiments, the GUI section 300D can enable a user to define offsite retention policies which specify how long a NAS device should retain snapshots of the created share in the cloud or remote repository device. Similarly to the local snapshot retention policies, the offsite retention policies can comprise intra-daily to dailies intervals 331 dailies to weekly intervals 333, weeklies to monthly intervals 335, and delete offsite 337 to delete a copy of the a share in the offsite location.

Figure 4:
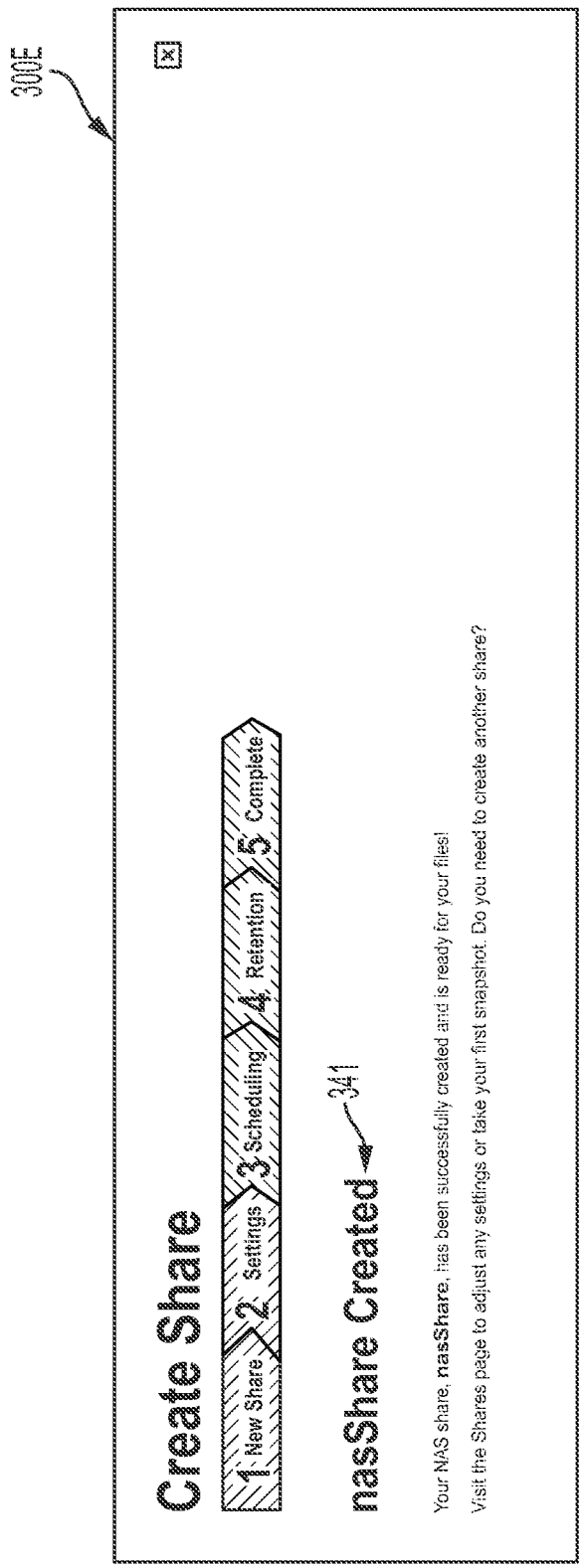
FIG. 4 shows additional respective GUIs, provided by the NAS apparatus of FIG. 1A, to confirm creation in memory of the NAS apparatus of a logical storage area (LSA) share with particular privacy settings, according to one inventive embodiment.

FIG. 4 shows an example screenshot of a GUI section 300E provided by the NAS. In some embodiments, a GUI section 300E can provide a user with information about the creation of a share status 341.

NAS Data Flows for Creating and Sharing Files

Figure 5A:
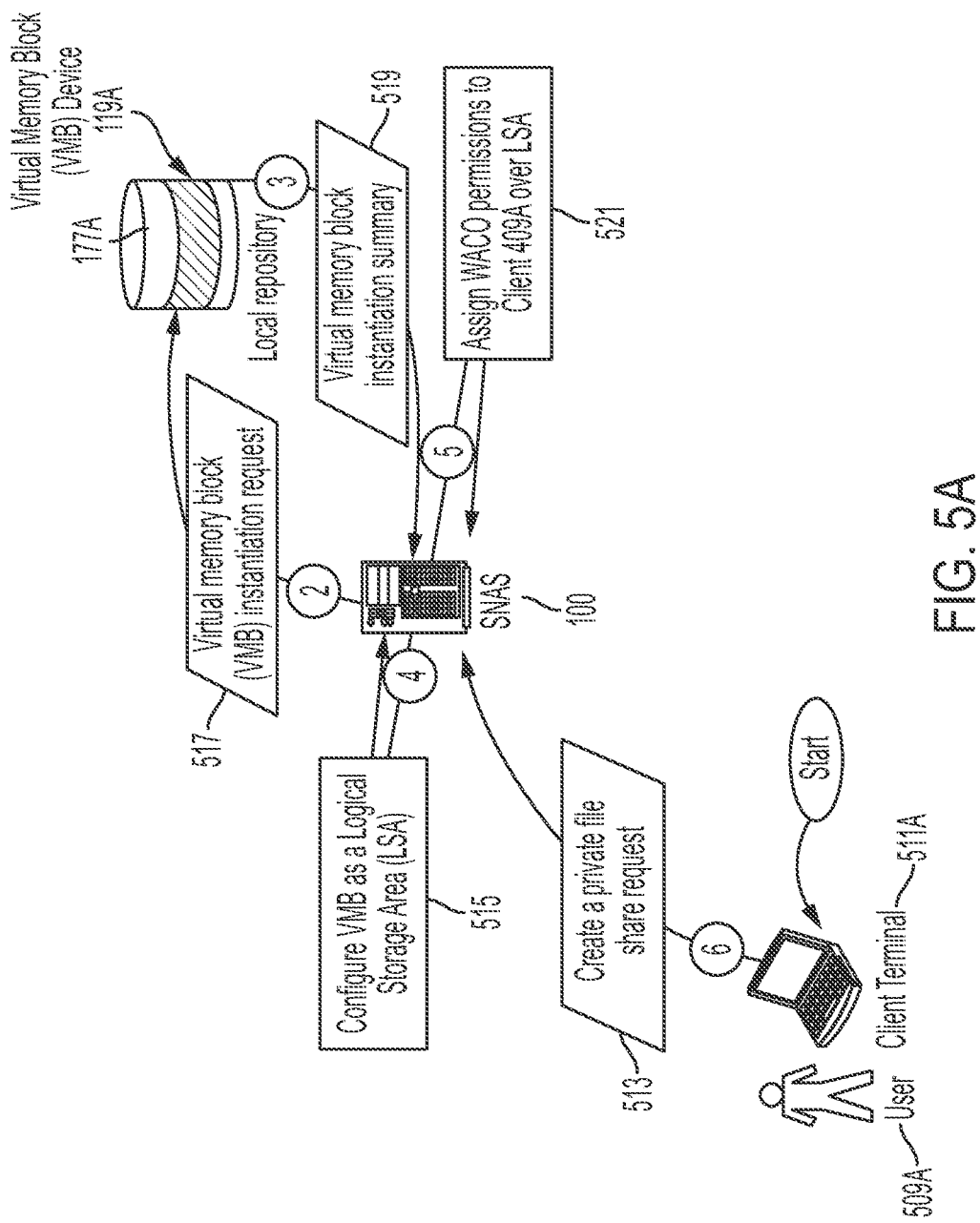
FIG. 5A shows an example data flow illustrating aspects of creating an LSA share in the NAS apparatus of FIG. 1A, according to one inventive embodiment.

FIG. 5A shows an example data flow illustrating aspects of creating a file share in a NAS, in one embodiment of the present invention. In some embodiments, a user 509A (e.g., a person) in communication with client terminal 511A can initiate a create file share request 511A which the client terminal 511A transmits to the NAS 100. The file share request 513 includes the configuration elements selected by the user on the GUI shown on FIGS. 3A-3D and client authentication credentials.

An example of a create a private file share request 513 substantially in the form of an HTTP(S) POST message including XML-formatted data, is provided below:

```
POST /create_private_share_request.php HTTP/1.1
Host: www.NAS.com
Content-Type: Application/XML
Content-Length: 667
<?XML version = "1.0" encoding = "UTF-8"?>
<pfs_request>
   <timestamp>2020-12-12 15:00:00</timestamp>
   <device_ID>2027</device_ID>
   <client_terminal_credentials>
      <password>secretpass1234</password>
      <private_key>j341engi648et456#@hnnengywrksxbi</private_key>
   </client_terminal_credentials>
   <client_credentials>
      <client_name>John Doe</client_name>
      <client_password>904aA409<client_password>
   </client_credentials>
   <share_config_info>
      <share_name>myShare</share_name>
      <share_type>NAS</share_type>
      <config>new_config</config>
      <share_access>private<share_access>
      <users>JDoe49</users>
      <NFS>True</NFS>
      <FTP>True</FTP>
      <AFP>False</AFP>
      <snapshot_interval>60</snapshot_interval>
      <offsite_sync>8</offsite_sync>
      <snapshot_retention>
         <intra_daily>7</intra_daily>
         <dailies_weekly>4</dailies_weekly>
         <weeklies_monthly>2</weeklies_monthly>
         <delete_local>never</delete_local>
      </snapshot_retention>
   .
   .
   .
   </share_config_info>
</pfs_request>
```

The NAS 100A, 100B can send a virtual memory block instantiation request 517 to the local repository 177A in response to the request 513. A Virtual Memory Block (VMB) instantiation summary 519 can be sent from the local repository to the NAS 100 in response to the request 517. The VMB instantiation summary 519 may indicate if the VMB instantiation was successful or not. A successful acknowledgement can be followed by a NAS function to configure the instantiated VMB as a Logical Storage Area (LSA) in step 515. In some embodiments, one or more virtual memory blocks 119A can be configured in the local repository 177A as LSAs. In some further embodiments, a LSA can be implemented under an underlying Redundant Array of Independent Disks (RAID).

In some embodiments, Write Access for Creator Only (WACO) can be the default access privilege/permission for any item or digital object created on a private share. For example, subsequently from configuring an LSA, the NAS can assign WACO permissions to the user 509A as shown in the step 521. In some embodiments, WACO can mandate write access for the creator only and, optionally, read and executable access for all other users with root permissions and/or file share permissions. The optional read and executable permissions can of WACO can help to specify alternative versions wherein read and/or write permissions are not included.

Figure 5B:
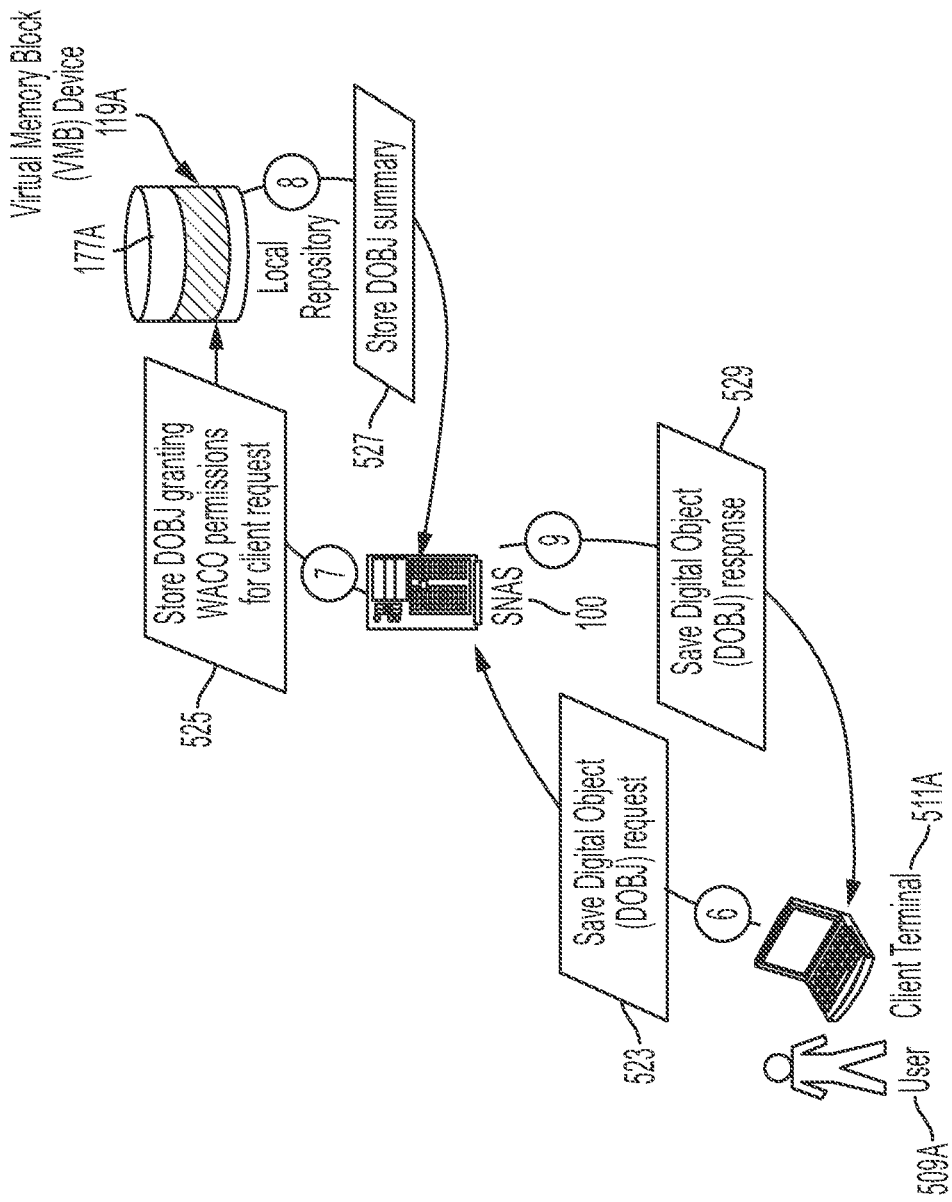
FIG. 5B shows an example data flow illustrating aspects of saving a digital object in an LSA share of the NAS apparatus of FIG. 1A, according to one inventive embodiment.

FIG. 5B shows an example data flow illustrating aspects of saving a digital object in a NAS file share, in one embodiment of the present invention. As shown in FIG. 5B, a client 509A uses a client terminal 511A to initiate a save a digital object (DOBJ) request 523. As mentioned above, a digital object can be a digital file or folder.

Figure 5C:
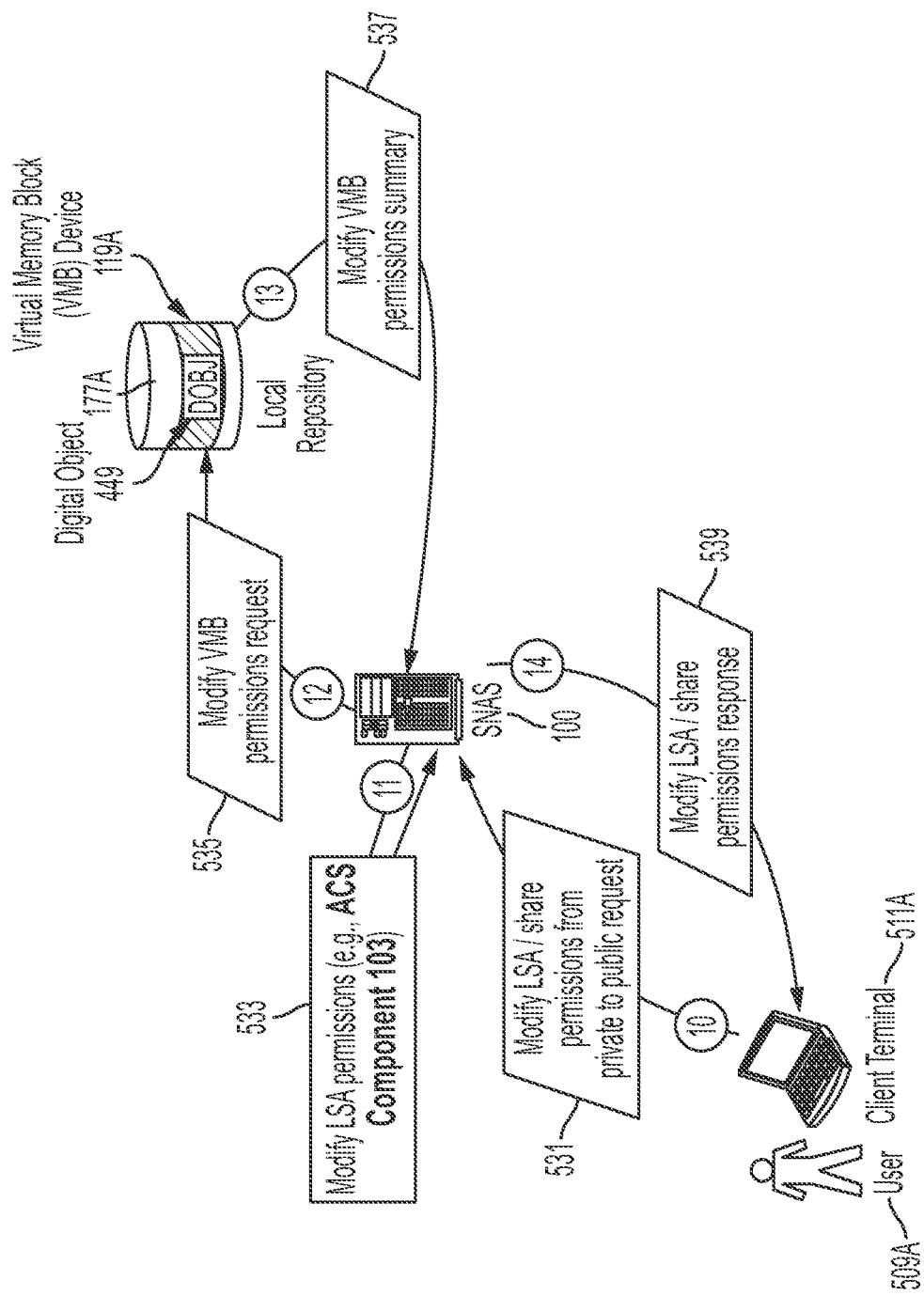
FIG. 5C shows an example data flow (e.g., performed pursuant to execution of an examplary Access Control System (ACS) Component) illustrating aspects of changing a privacy setting of an LSA share of the NAS apparatus of FIG. 1A, according to one inventive embodiment.

The client terminal 511A transmits the request 523 to the NAS 100, which receives the request 523 and subsequently stores the digital object in the local repository 177A. The NAS 100 also grants WACO permissions for the user 509A in the local repository 177A as shown in the step 525. Thereafter, the local repository 177A sends a stored DOBJ summary 527 to the NAS 100. The stored DOBJ summary 527 indicates if the requested store operation was successful or not. Thereafter, the NAS 100 can send a save digital object response 529 to the client terminal 511A to inform the client 509A whether or not the object was successfully saved FIG. 5C shows an example data flow illustrating aspects of changing a NAS file share permissions, in one embodiment of the present invention. A user 509A uses the client terminal 511A to transmit a request 531 to modify LSA/share permissions from private to public request 531 to the NAS 100. In some embodiments, having public permissions over a share means that all users with access to a local subnet have Write Access for All (WAA) permissions, this means that the users have read, write and execute access over the share. Although this disclosure describes and illustrates WACO and WAA permissions with respect to file shares and digital objects, this disclosure contemplates other types of permissions which can be managed in a similar way as in the described embodiments, including but not limited to Microsoft Access Control List permissions and their equivalents in different platforms. For example, permissions for traversing and navigating a file system but with no permission to read and/or open any digital object; permissions to transfer or take ownership over a file share or a digital object; and the like permissions.

In response to the request 531 the NAS 100 executes a process to modify the LSA permissions as shown in the step 533. The process may be implemented substantially in the form of php code and shell commands as presented below:

```
/**
 * Modifies LSA permissions from private to public
 *
 * @return bool
 */
public function makePublic( ) {
    if( !$this->isPublic ) {
        $propertiesToSet = array (
            'valid users'   => null,   // remove valid users
            'admin users'   => null,   // remove admin users
            'guest ok'      => 'yes',  // guest ok
            'read only'     => 'no'    //
        );
        if( $this->setProperties($propertiesToSet) ) {
            $this->isPublic = true;
        }
        //Change initial User read/write permissions to read-write
        // and change existing files to rw access for all users
        if( $this->changeACLMode( 'no_acl' ) && !empty( $this->path )){
            $cmdstr = "chmod -R 0777 " . $this->path;
            exec( $cmdstr );
        }
    }
    return $this->isPublic;
}
/**
 * Modify LSA permissions from public to private
 *
 * @return bool
 */
public function makePrivate( ) {
    if( $this->isPublic ) {
        $propertiesToSet = array (
            'valid users'   => null,   // remove valid users
            'admin users'   => null,   // remove admin users
            'guest ok'      => null,   // guest ok
            'read only'     => 'no'    //
```

```
        );
        if( $this->setProperties( $propertiesToSet ) ) {
            $this->isPublic = false;
        }
        //Change initial User read/write permissions to read-only
        $this->changeACLMode( 'acl_and_mask' );
    }
    return $this->isPublic;}
```

Figure 7A:
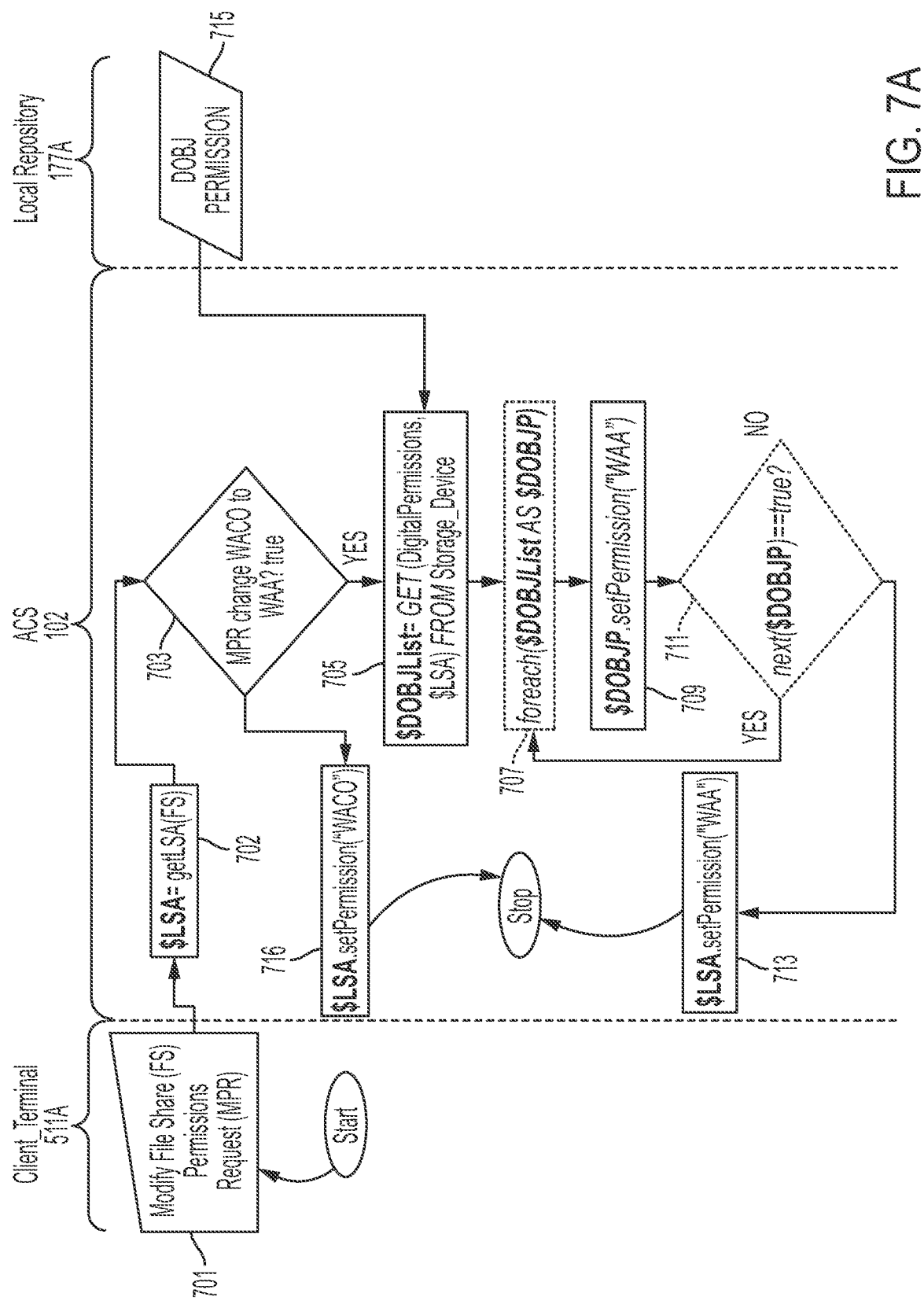
FIG. 7A shows an example data flow illustrating aspects of modifying a privacy setting of an LSA share of the NAS apparatus of FIG. 1A, according to one inventive embodiment.
Figure 7B:
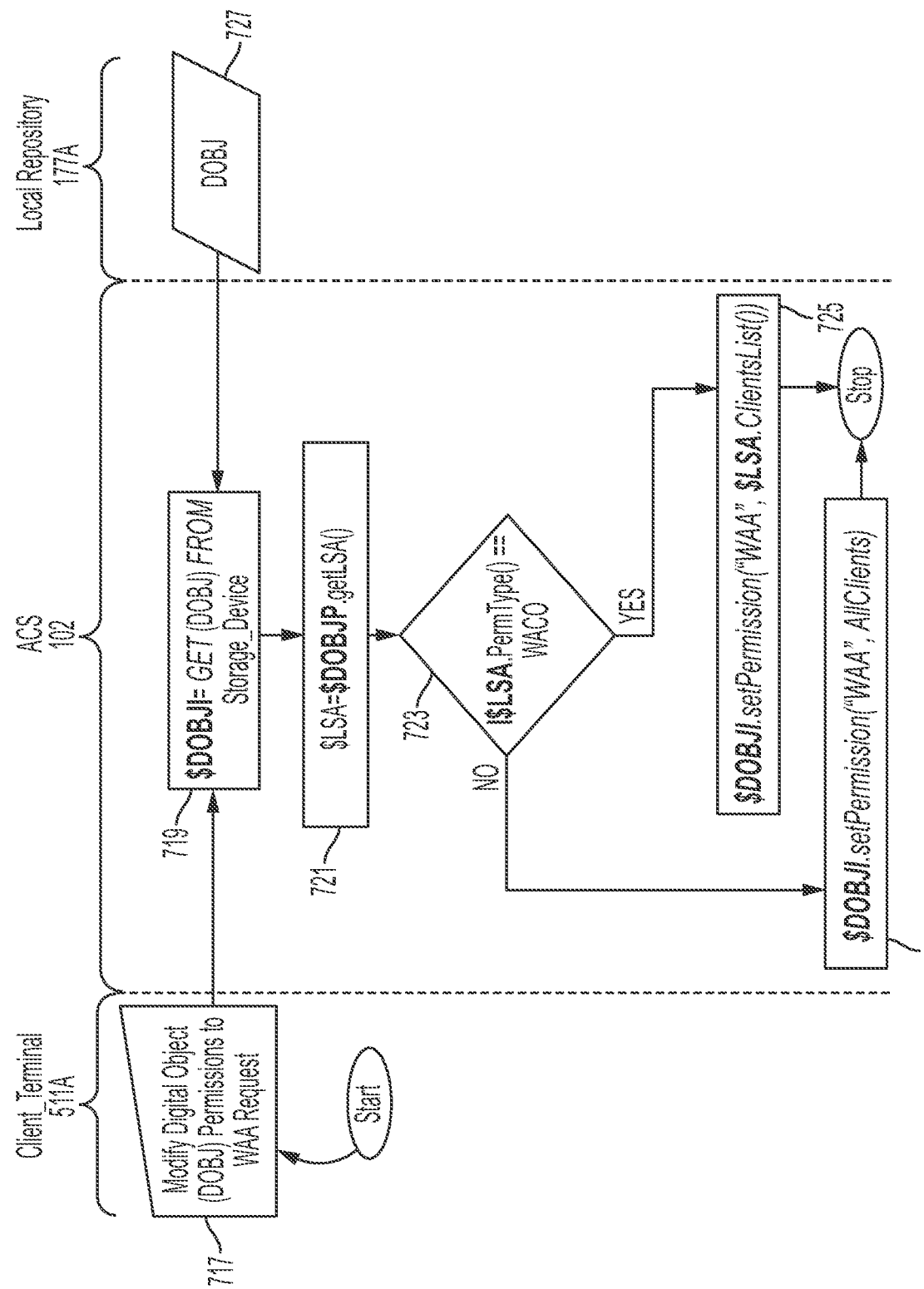
FIG. 7B shows an example data flow illustrating aspects of modifying digital object permissions in an LSA share of the NAS apparatus of FIG. 1A, according to one inventive embodiment.
Figure 7C:
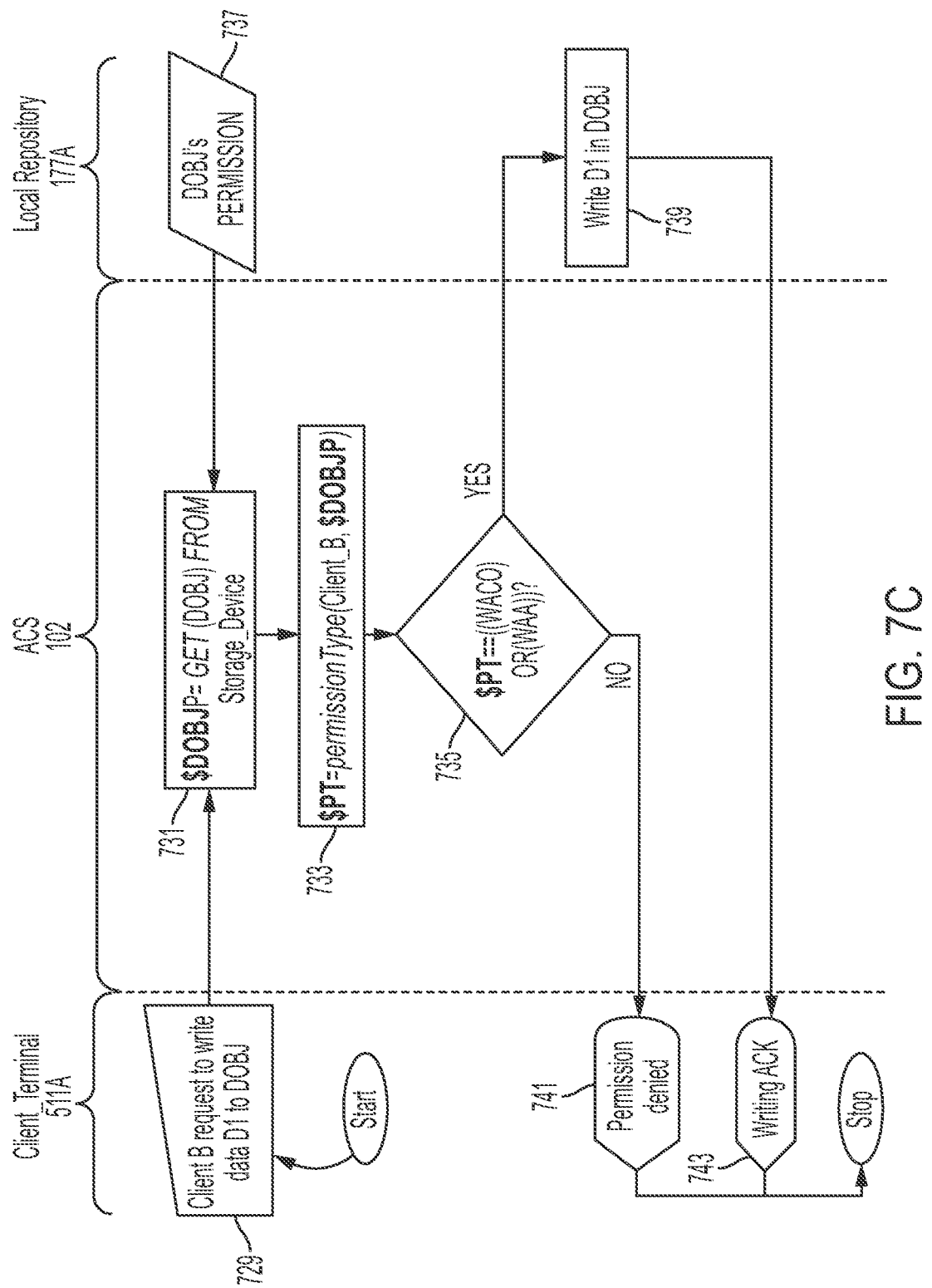
FIG. 7C shows an example data flow illustrating aspects of verifying client permissions by an ACS component, according to one inventive embodiment.

Such a process can be performed by a NAS component, for example, the ACS component 102 shown in FIG. 1 (more details about the ACS component are discussed in this specification with respect to FIGS. 7A-7C). Thereafter, the NAS 100 can send a modify virtual memory block (VMB) command 535 to the local repository 177A. Once the request 535 is received by the local repository 177A, the permissions of the VMB 119A associated with the LSA indicated in the request 531 are changed from WACO to WAA. Similarly, the permissions to one or more digital objects e.g., 449 stored in the virtual memory block 119A can be changed from WACO permissions to WAA permissions.

In implementations in which the network file system protocol employed by the NAS apparatus is Samba, certain Samba configuration files may be employed in connection with reconfiguration of an LSA share from private access to public access, from public access to private access, or from private access with WACO permission to private access with WAA permissions (or vice versa). Some nonlimiting examples of Samba configuration files are provided below.

The following Samba configuration file corresponds to an LSA share having private access with WACO permissions for two users ClientA and Client C:

```
[nasShare]
path = /datto/mounts/nasShare
create mask = 0755
force create mode = 0755
security mask = 2777
force security mode = 0000
directory mask = 0755
force directory mode = 0755
directory security mask = 2777
force directory security mode = 0000
nt acl support = yes
valid users = clientA clientC
veto files = /lost+found/.locate.db
read only = no
```

The following Samba configuration file corresponds to an LSA share having private access with WAA permissions for two users ClientA and Client C:

```
[nasShare]
path = /datto/mounts/nasShare
create mask = 0777
force create mode = 0777
security mask = 2777
force security mode = 0000
directory mask = 2777
force directory mode = 2777
directory security mask = 2777
force directory security mode = 0000
nt acl support = yes
valid users = clientA clientC
veto files = /lost+found/.locate.db
read only = no
```

The following Samba configuration file corresponds to an LSA share having public access:

```
[nasShare]
path = /datto/mounts/nasShare
create mask = 0777
force create mode = 0777
security mask = 2777
force security mode = 0000
directory mask = 2777
force directory mode = 2777
directory security mask = 2777
force directory security mode = 0000
nt acl support = yes
valid users = nobody
veto files = /lost+found/.locate.db
read only = no
guest ok = yes
```

In some embodiments, the local repository 177A can send a modify VMB permissions summary 537 to the NAS indicating if the requested permission changes 535 were successfully performed or not. A modify LSA/share permission response 539 is then sent by the NAS 100 to the client terminal 511A in response to the request 531 indicating to the user if the request 537 was successful or not.

Figure 5D:
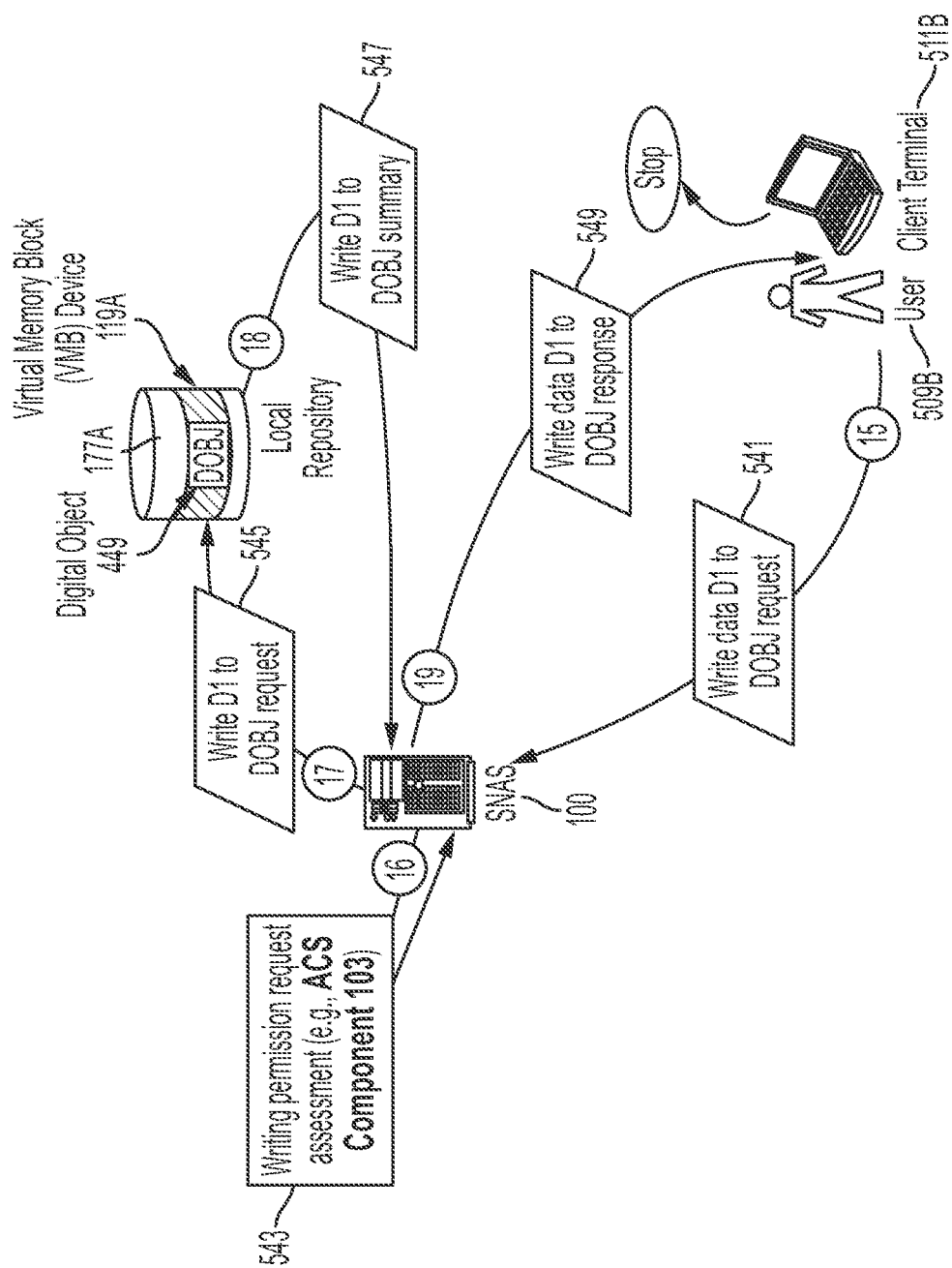
FIG. 5D shows an example data flow (e.g., performed pursuant to execution of an examplary ACS Component) illustrating aspects of a non-creator user writing action to a digital object residing in an LSA share of the NAS apparatus of FIG. 1A, according to one inventive embodiment.

FIG. 5D shows an example data flow illustrating aspects of a non-creator user writing action to a digital object residing in a NAS file share, in one embodiment of the present invention. In this example, user 509B uses client terminal 511B to instantiate a write data D1 to a digital object DOBJ request 541 sometime after the NAS 100 has generated a successful indicator in the response 539 in FIG. 5C.

The NAS 100 receives the request 541 and starts a writing permission request assessment process 543. Such a process can be performed by (the ACS) component 102 shown in FIG. 1 and described in greater detail with respect to FIGS. 7A-7C). Thereafter, the NAS 100 can send a write D1 to DOBJ request 545 to the local repository 177A which results in a writing operation of the data D1 into the digital object 449. The local repository 177A can send a write D1 to DOBJ summary 547 to the NAS 100 indicating if the requested writing operation 545 was successfully performed or not. A write data D1 to DOBJ response 549 is then sent to the client terminal 511B in response to the request 541.

NAS Data Flows for Synchronizing Data Files

Figure 6:
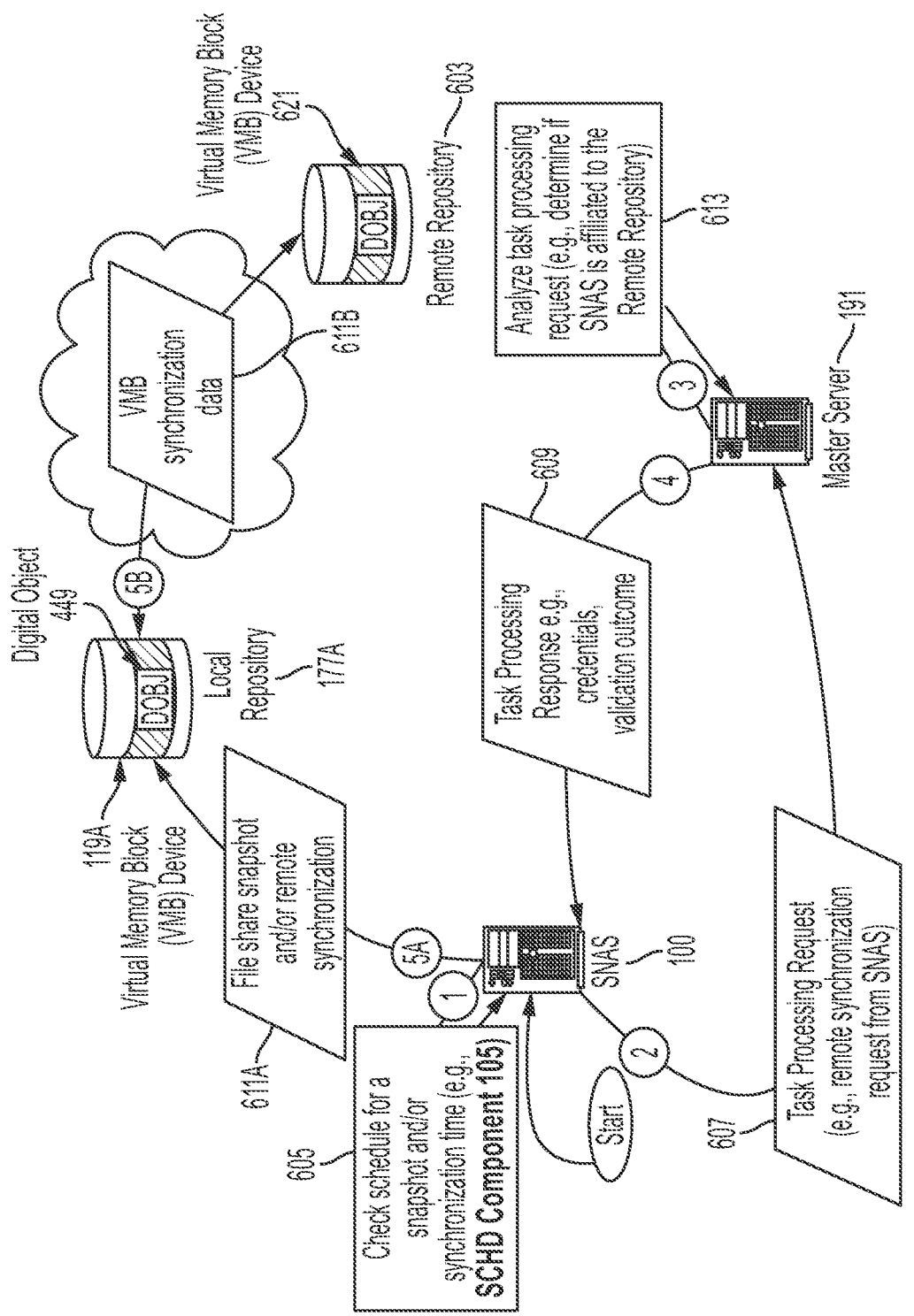
FIG. 6 shows an example data flow illustrating aspects of a time-based snapshot and synchronization of at least one LSA share of the NAS apparatus of FIG. 1A, according to one inventive embodiment.

FIG. 6 shows an example data flow illustrating aspects of a time-based snapshot and synchronization of NAS content, in one embodiment of the present invention. In some embodiments, the NAS 100 can have a time-based background process or daemon enabling the continuous verification or check of a schedule for a snapshot and/or remote synchronization time 605. Additionally, snapshots and/or offsite synchronizations can be performed upon a user request.

In some embodiments, the NAS 100 can send a task processing request 607 to the Master Server 191, comprising, for example, a remote synchronization request. The request 607 can include a pairing contract vector comprising a virtual memory block device indicator (for example, an identifier or indicator referencing to the VMB device 119A which underlies an LSA) and a replication relationship between the LSA and a remote storage device (for example, a remote repository 603). The pairing contract is a digital artifact which serves to validate the legitimacy of an offsite synchronization request. In some embodiments, the validation procedure can prevent the offsite synchronization of devices that are not in compliance with of one or more service providers.

The master server 191 can analyze the task processing request 607 to determine if the pairing contract vector is valid or not in step 613. The master server 191 sends the results of the analysis 613 to the NAS 100 in a task processing response 609, which comprises a positive, negative, or corrective validation outcome. A positive outcome indicates that there is a legitimate replication relationship between the NAS 100 and the master server 191. In some instances; the task processing response 609 comprises access security credentials with respect to one or more repositories, including the remote repository 603. Thereafter, the NAS 100 can send a file share snapshot and remote synchronization command as shown in step process 611A which will start a process to take one or more snapshots capturing the state of one or more VMB devices, for example 119A, including their content, for example, the digital object device DOBJ 449. A copy of the one or more snapshots can be stored in the local repository as a retained version. Additionally, after the latest state has been captured with respect to one or more VMBs through the one or more snapshots, a file share synchronization data process can be initiated between the local repository 177A and the remote repository 603.

In some embodiments, during the synchronization between local repository 177A and remote repository 603, VMB synchronization data 611B can be sent in from the local repository 177A to the remote repository 603 and the other way around. After the exchange of VMB synchronization data 611B, one or more VMB devices in the local repository 177A can comprise the same content as one or more VMB devices in the remote repository, for example VMB device 119A may mirror VMB device 621.

Data Flow for a NAS ACS Component

FIG. 7A shows an example data flow illustrating aspects of modifying file share permissions by an Access Control System (ACS) component 102, in one embodiment of the present invention. In some embodiments, an ACS component 102 can receive a modify file share permission request (MPR) 701 from a client terminal 511A. The MPR 701 may comprise a reference variable for a File Share (FS). The ACS component 102 can determine a logical storage area identifier $LSA from the file share reference as shown in the operation 702.

In some embodiments, when the Modify Permission Request (MPR) 701 specifies to modify a file share permissions from WACO to WAA 703, then the ACS component 102 retrieves a reference 715 to permissions of one or more digital objects stored in the logical repository 177A by executing a GET command as shown in the step 705. A list of digital object permissions (e.g., $DOBJList in 705) stored in a File Share (FS) configured as a logical storage area can be instantiated by the ACS component 102 to capture the returned values after the execution of the GET command in 705. Thereafter, a loop is started in the ACS component 102 which will iterate a number of times equivalent to the number of items in the $DOBJList e.g., 707.

In some embodiments, each item in the $DOBJList contains a reference to the permissions of a digital object contained in the local repository 177A. The permissions of each item in the $DOBJList are set to be WAA permissions 709 until all the items in the $DOBJList are exhausted as tracked by a conditional statement 711. Once all the permissions of the items in $DOBJList have been modified, the permissions to the logical storage area $LSA determined in the operation 702 can be set to be WAA as shown in step 713.

In some embodiments, when the modify permission request is not from WACO to WAA, it could be imply that it is from WAA to WACO, in such a case, the permissions to the logical storage area $LSA determined in the operation 702 can be set to be WACO 716.

FIG. 7B shows an example data flow illustrating aspects of modifying digital objects permissions by the ACS component 102, in one embodiment of the present invention. In FIG. 7B, the ACS component 102 receives a request to modify digital object (DOBJ) permissions to WAA (MDOBJ) 717. The request comprises a reference variable to a digital object (DOBJ) stored in the local repository 177A. In such a case, the ACS component 102 can retrieve the stored digital object 727 from the logical repository 177A by executing a GET command for example 719. In some embodiments, an instantiation or a pointer $DOBJI object can be generated to captured the returned or referenced digital object after the execution of the GET command in 719. Thereafter, an $LSA identifier can be determined through a getLSA( ) method performed by the $DOBJP, for example operation 721.

In some embodiments, the permissions associated with the $LSA are evaluated to determine if they specify WACO permissions or not 723. In some embodiments, when the $LSA grants WACO permissions only to an specific client entity or entities, the permissions of the digital object DOBJ 727 are set to be WAA, but only to those client entities that have WACO permissions over the $LSA containing the $DOBJ 727. An example of such operation is provided in 725.

In some embodiments, when the $LSA does not grant WACO permission it can be implied that the $LSA grants WAA permissions 723. In such a case, the permissions of the digital object DOBJ 727 are set to be WAA to all clients belonging to a subnet, an example of such operation is provided in 728.

FIG. 7C shows an example data flow illustrating aspects of verifying clients' permissions by an Access Control System (ACS) component, in one embodiment of the present invention. In some embodiments, an ACS 102 can receive a write data D1 to a digital object DOBJ request from client B as shown in 729. Such a request can be received from the client terminal, for example client terminal 511B. In such a case, the ACS 102 can retrieve a reference 737 to the permissions of one or more digital objects DOBJ indicated in the request 729 an example of such operation is provided in 731.

A copy of the digital objects DOBJ permissions can be stored in the variable or array $DOBJP as shown in the step 731. Thereafter, the permissions of client B with respect to the digital object DOBJ can be determined as in step 733.

In some embodiments, if the client B has WACO or WAA permissions over the digital object DOBJ (conditional statement 735) then, the ACS component executes a writing action into the digital object DOBJ 739 and a writing acknowledgment message 743 is sent to the client terminal 511B. However, if the client B does not have WACO or WAA permissions over the digital object DOBJ (conditional statement 735) then, the ACS component sends permission denied message 741 to the client terminal 511B.

NAS File Share Rules

FIG. 8A shows an example of file share rules implemented by an ACS component 102, in one embodiment of the present invention. In some embodiments, when a file share is created on a NAS 100 a user can be offered a choice to create either a public share or a private share. Public and private file shares differ in the type of permissions/privileges or visibility they grant a group of clients and/or users. In some embodiments, the NAS 100 comprise Access Control System (ACS) component 102 managing user permissions with respect to items and/or objects residing in a plurality of shares.

In some further embodiments, when a private share is created, all users can be granted with read and execution access to the stored items or objects but only the creator or creator group may have permission to write to the items or objects. In some embodiments, Write Access for Creator Only (WACO) can be the default access privilege/permission for any item or digital object created on a private share. In some embodiments, WACO can imply write access for the creator only and read access for all other users with root permissions and/or file share permissions.

In some embodiments, a user may change a permissions associated with a file share by executing a command to change the permissions of a file share. For example, when a file share is created, a user can choose between create a private share or a public share. When the user selects to create a private share, all the items and objects stored and created in such a share can have WACO permissions by default. Alternatively, when the user selects to create a public share, all the items and objects stored and created in such a share can have WAA permissions by default. Thereafter, a user can change the file share type seamlessly between private and public or public and private as desired. Furthermore, a corresponding change on the access permissions of the any existent items or objects residing in such a file share can be automatically performed by one or more components of the NAS 100.

Moreover, some specific embodiments of the present invention enable a user to automatically and seamlessly convert a private file share hosted on a Linux-based storage server to a public file share providing permissions to a plurality of Windows clients. Such an automated and seamless performance prevents the occurrence of stranded items or objects (e.g., files and folders) that typically arises after converting file shares from private to public in cross-platform client-server systems.

The seamless change to file share permissions is enabled by an ACS 102 enhanced with processor readable instructions to satisfy the set of rules described in table 800A. Specifically, when a command is received to change a private share to a public share, the permissions of any residing digital object, for example, files and folders in the private share will be modified to have WAA permissions and any new digital object created in the file share after the file share has been updated to be public will be assigned WAA permissions. The changes implemented by the ACS 102 rule over the file share and digital objects or items stored in a local repository.

In some embodiments, the items or objects stored in a public share can be accessed by anyone who has network access or root permissions. In some embodiments, when a public share is created and/or after a private share has been converted to a public share, creator and non-creator users are granted read, write and execution permissions over any item or object (e.g., files, directories and the like) residing in the public share. In some embodiments, Write Access for All (WAA) can be the default access privilege/permission for any item or object created on a public share. In some embodiments WAA can imply write access for all users, read access for all users and execution access for all users (equivalent to a chmod 777 in a Unix-like system).

The rules are not limited to change public and private permissions, in some embodiments; the permissions can be granted and changed over specific sets of users. For example, the permissions can be changed from WAA permissions granted to a set of N users to WACO permissions granted to an N-X set of users and the other way around as shown in rules 703. A person of the ordinary skill in the art would appreciate that more rules can be implemented in a similar way as described in this application.

FIG. 8B shows an example of private share object rules implemented by an Access Control System (ACS) component, in one embodiment of the present invention. In some embodiments, the ACS component can restrict and/or allow certain operations to be performed by a user or group of users over the items stored in a private share. In some embodiments, the permissions to operate on digital objects or items stored in a private share can be granted to one user/creator and/or to a group of users designated as the creator group. In some embodiments, when users attempt to connect to a private share over a network, a login page can be displayed for the users where they can provide a user id and/or password to gain access to the private share and/or the stored items.

In some embodiments, a user can change through a user interface access privileges with respect to digital objects or items residing on a private share from WACO to WAA. For example, by executing a command, in some embodiments the ACS component 102 changes the privileges of such digital object or item seamlessly avoiding faulty and/or unexpected behavior by implementing processor readable instructions to satisfy the set of rules described in table 800B.

NAS Local and Remote Replication

FIG. 9 shows an example data flow illustrating aspects of a scheduler daemon for local and remote replication (e.g., an example scheduler (SCHD) Component), in one embodiment. In some embodiments the SCHD component 104 can run as a background process and/or daemon which continuously verifies the current time 905. In some embodiments, when the current time matches a remote replication or synchronization time (e.g., conditional statement 909) then one or more snapshots are taken capturing the state of one or more logical storage areas configured in a NAS as shown in operation 913. Then, the snapshot or snapshots are stored with a time stamp indicating the time when the snapshot was taken 917 in a remote repository 903. Thereafter, an acknowledgement message can be sent to the SCHD component 104 indicating a successful storage operation 919.

In some further embodiments, when the current time matches a local replication (e.g., conditional statement 907) or snapshot schedule, then one or more snapshots are taken capturing the state of one or more logical storage areas configured in a NAS as shown in operation 911. Then, the snapshot or snapshots are stored with a time stamp indicating the time when the snapshot was taken (as shown in 915) in a local repository 903. The local repository 903 can be within the body of the NAS or it can be an independent storage device communicatively coupled with the NAS. Thereafter, an acknowledgement message can be sent to the SCHD component 104 indicating a successful storage operation 919.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments of the invention can be implemented in any of numerous ways. For example, some embodiments may be implemented using hardware, software or a combination thereof. When any aspect of an embodiment is implemented at least in part in software, the software code can be executed on any suitable processor or collection of processors, whether provided in a single computer or distributed among multiple computers.

In this respect, various aspects of the invention may be embodied at least in part as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other tangible computer storage medium or non-transitory medium) encoded with one or more programs that, when executed on one or more computers or other processors, perform methods that implement the various embodiments of the technology discussed above. The computer readable medium or media can be transportable, such that the program or programs stored thereon can be loaded onto one or more different computers or other processors to implement various aspects of the present technology as discussed above.

The terms "program" or "software" are used herein in a generic sense to refer to any type of computer code or set of computer-executable instructions that can be employed to program a computer or other processor to implement various aspects of the present technology as discussed above. Additionally, it should be appreciated that according to one aspect of this embodiment, one or more computer programs that when executed perform methods of the present technology need not reside on a single computer or processor, but may be distributed in a modular fashion amongst a number of different computers or processors to implement various aspects of the present technology.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, the technology described herein may be embodied as a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A network attached storage (NAS) apparatus to provide network-based data storage for a local area network (LAN) including at least a first client computing device, the NAS apparatus comprising:
   a communication network interface to communicatively couple the NAS apparatus to at least the first client computing device in the LAN;
   an input/output interface;
   a memory storing processor-executable instructions comprising a NAS operating system and a first network file system protocol for the NAS apparatus; and
   at least one processor coupled to the communication network interface, the input/output interface, and the memory, wherein upon execution by the at least one processor of at least some of the processor-executable instructions, the at least one processor:
      A) configures, pursuant to first instructions received via at least one of the communication network interface and the input/output interface, a first portion of the memory as a first logical storage area (LSA) share to store a first plurality of objects, wherein the first plurality of objects include at least one of at least one file and at least one folder, and wherein the first plurality of objects are accessed on the first LSA share according to the first network file system protocol;
      B) configures, pursuant to second instructions received via at least one of the communication network interface and the input/output interface, a first privacy setting for the first LSA share as private access; and
      C) reconfigures, pursuant to third instructions received via at least one of the communication network interface and the input/output interface, the first privacy setting for the first LSA share as public access;
   updates an access control list (ACL) for each object of the first plurality of objects that are already stored on the first LSA share prior to C) to permit access to each object after the first privacy setting for the first LSA share is changed from private access to public access;
   wherein:
      the ACL for each object of the first plurality of objects that are already stored on the first LSA share prior to C) includes object permissions for each object representing permitted operations on each object by at least one private share user, wherein the permitted operations include at least one of a read operation, a write operation, and an execute operation; and updates the object permissions for each object of the first plurality of objects that are already stored on the first LSA share prior to C) to permit at least the write operation on each object for all LAN users.

2. The NAS apparatus of claim 1, wherein in A), the at least one processor configures the first portion of the memory as the first LSA share by:

creating a virtual memory block in at least the first portion of the memory; and configuring the virtual memory block with a file system used by the NAS operating system to facilitate storage of the first plurality of objects on the first LSA share.

3. The NAS apparatus of claim 2, wherein: in C), the at least one processor reconfigures the first privacy setting for the first LSA share as public access by configuring the first network file system protocol for the NAS apparatus to generate an access control list (ACL) for at least a first object of the first plurality of objects when the first object is created on the first LSA share, wherein:

the generated ACL includes initial object permissions representing permitted operations on the first object by all LAN users; and the initial object permissions are set such that the permitted operations on the first object include a read operation, a write operation, and an execute operation.

4. The NAS apparatus of claim 3, wherein after C), the at least one processor reconfigures the first privacy setting for the first LSA share from public access to private access by:

reconfiguring the first network file system protocol for the NAS apparatus to generate, when a new object of the first plurality of objects is created on the first LSA share, an ACL for the new object, wherein:

the at least one private share user includes a creator of the new object;

initial object permissions for the new object represent permitted operations on the new object by the at least one private share user; and the initial object permissions for the new object are set such that:

the permitted operations on the new object for the creator of the new object include at least one of the read operation, the write operation, and the execute operation; and the permitted operations on the new object for other private share users of the at least one private share user also include at least one of the read operation, the write operation, and the execute operation.

5. The NAS apparatus of claim 3, wherein after C), the at least one processor reconfigures the first privacy setting for the first LSA share from public access to private access by:

reconfiguring the first network file system protocol for the NAS apparatus to generate, when a new object of the first plurality of objects is created on the first LSA share, the ACL for the new object, wherein:

the at least one private share user includes a creator of the new object;

the initial object permissions for the new object represent the permitted operations on the new object by the at least one private share user; and the initial object permissions for the new object are set such that:

the permitted operations on the new object for the creator of the new object include the read operation, the write operation, and the execute operation; and the permitted operations on the new object for other private share users of the at least one private share user include the read operation and the execute operation and not the write operation.

6. The NAS apparatus of claim 2, wherein:

in B), the at least one processor configures the first privacy setting for the first LSA share as private access by configuring the first network file system protocol for the NAS apparatus to generate, when each object of the first plurality of objects is created on the first LSA share, an access control list (ACL) for each object, wherein:

the generated ACL includes initial object permissions for each object representing the permitted operations on each object by the at least one private share user; and the initial object permissions are set such that:

the permitted operations for a creator of each object include the read operation, the write operation, and the execute operation; and the permitted operations for other private share users of the at least one private share user include at least one of the read operation, the execute operation, and the write operation.

7. The NAS apparatus of claim 6, wherein in C), the at least one processor reconfigures the first privacy setting for the first LSA share from private access to public access by:

C1) updating legacy object permissions for each object of the first plurality of objects that are already stored on the first LSA share prior to C) such that the permitted operations include the read operation, the write operation, and the execute operation on each object for all LAN users; and C2) reconfiguring the first network file system protocol for the NAS apparatus to generate, when a new object of the first plurality of objects is created on the first LSA share, the ACL for the new object such that initial object permissions of the ACL of the new object permit the read operation, the write operation, and the execute operation on the new object for all LAN users.

8. The NAS apparatus of claim 1, wherein:

the NAS operating system is a Unix operating system; and the first network file system protocol is the Samba protocol.

9. The NAS apparatus of claim 8, wherein:

the first client computing device in the LAN operates one of a Windows operating system, a Mac operating system and a Linux operating system to access the first plurality of objects stored on the first LSA share via the Samba protocol.

10. The NAS apparatus of claim 1, wherein the first network file system protocol is one of a Network File Share (NFS) access protocol, a File Transfer Protocol (FTP), and an Apple Filing Protocol (AFP).

11. The NAS apparatus of claim 1, wherein upon execution by the at least one processor of the at least some of the processor-executable instructions, the at least one processor further:

configures, pursuant to fourth instructions received via the communication network interface, a second portion of the memory as an interne Small Computer System Interface (iSCSI) share to provide block-based storage that appears as a virtual disk drive to at least the first client computing device in the LAN.

12. A network attached storage (NAS) apparatus to provide network-based data storage for a local area network (LAN) including at least a first client computing device, the NAS apparatus comprising:
- a communication network interface to communicatively couple the NAS apparatus to at least the first client computing device in the LAN;
- an input/output interface;
- a memory storing processor-executable instructions comprising a Linux operating system and a Samba network file system protocol for the NAS apparatus; and
- at least one processor coupled to the communication network interface, the input/output interface, and the memory, wherein upon execution by the at least one processor of at least some of the processor-executable instructions, the at least one processor:
    - A) configures, pursuant to first instructions received via at least one of the communication network interface and the input/output interface, a first portion of the memory as a first logical storage area (LSA) share to store a first plurality of objects, wherein the first plurality of objects include at least one of at least one file and at least one folder, and wherein the first plurality of objects are accessed on the first LSA share according to the Samba network file system protocol;
    - B) configures, pursuant to second instructions received via at least one of the communication network interface and the input/output interface, a first privacy setting for the first LSA share as private access, wherein only at least one selected LAN user has access to the first LSA share, via at least the first client computing device, as at least one private share user; and
    - C) reconfigures, pursuant to third instructions received via at least one of the communication network interface and the input/output interface, the first privacy setting for the first LSA share as public access such that all LAN users have access to the first LSA share via at least the first client computing device, wherein the at least one processor reconfigures the first privacy setting as public access by updating an access control list (ACL) for each object of the first plurality of objects that are already stored on the first LSA share prior to C) to permit read, write and execute operations on each object for all LAN users after the first privacy setting for the first LSA share is changed from private access to public access.

13. A network attached storage (NAS) apparatus to provide network-based data storage for a local area network (LAN) including at least a first client computing device, the NAS apparatus comprising:
- a communication network interface to communicatively couple the NAS apparatus to at least the first client computing device in the LAN;
- an input/output interface;
- a memory storing processor-executable instructions comprising a NAS operating system and a first network file system protocol for the NAS apparatus; and
- at least one processor coupled to the communication network interface, the input/output interface, and the memory, wherein upon execution by the at least one processor of at least some of the processor-executable instructions, the at least one processor:
    - A) configures, pursuant to first instructions received via at least one of the communication network interface and the input/output interface, a first portion of the memory as a first logical storage area (LSA) share to store a first plurality of objects, wherein the first plurality of objects include at least one of at least one file and at least one folder, and wherein the first plurality of objects are accessed on the first LSA share according to the first network file system protocol;
    - B) configures, pursuant to second instructions received via at least one of the communication network interface and the input/output interface, a first privacy setting for the first LSA share as private access with one of Write Access for Creator Only (WACO) permissions and Write Access for All (WAA) permissions, wherein:
        - when the first privacy setting for the first LSA share is configured as private access with WACO permissions, only at least one selected LAN user has access to the first LSA share, via at least the first client computing device, as at least one private share user, and only an object creator of the at least one private share user has permission to perform a write operation for each new object created on the first LSA share by the object creator; and
        - when the first privacy setting for the first LSA share is configured as private access with WAA permissions, only the at least one selected LAN user has access to the first LSA share, via at least the first client computing device, as the at least one private share user, and all private share users of the at least one private share user have permission to perform a write operation for each new object created on the first LSA share; and
    - C) reconfigures, pursuant to third instructions received via at least one of the communication network interface and the input/output interface, the first privacy setting for the first LSA share as private access with the other of WACO permissions and WAA permissions.

14. The NAS apparatus of claim 13, wherein:
in B), the at least one processor configures the first privacy setting for the first LSA share as private access with WACO permissions by configuring the first network file system protocol for the NAS apparatus to generate, when each object of the first plurality of objects is created on the first LSA share, an access control list (ACL) for each object, wherein:
the ACL includes initial object permissions for each object representing permitted operations on each object by the at least one private share user; and
the initial object permissions are set such that:
the permitted operations for the object creator include a read operation, a write operation, and an execute operation; and
the permitted operations for other private share users of the at least one private share user include a read operation and an execute operation and not a write operation.

15. The NAS apparatus of claim 14, wherein in C), the at least one processor reconfigures the first privacy setting for the first LSA share from private access with WACO permissions to private access with WAA permissions by:
- C1) updating legacy object permissions for each object of the first plurality of objects that are already stored on the first LSA share prior to C) such that the permitted operations include a read operation, a write operation, and an execute operation on each object for all of the private share users; and
- C2) reconfiguring the first network file system protocol for the NAS apparatus to generate, when a new object of the first plurality of objects is created on the first LSA share, the ACL for the new object such that the initial object permissions of the ACL for the new object permit a read operation, a write operation, and an execute operation on the new object for all private share users.

16. The NAS apparatus of claim 13, wherein: in B), the at least one processor configures the first privacy setting for the first LSA share as private access with WAA permissions by configuring the first network file system protocol for the NAS apparatus to generate, when each object of the first plurality of objects is created on the first LSA share, an access control list (ACL) for each object, wherein:
the ACL includes initial object permissions for each object representing permitted operations on each object by the at least one private share user; and
the initial object permissions are set such that:
the permitted operations for the object creator include a read operation, a write operation, and an execute operation; and
the permitted operations for other private share users of the at least one private share user include a read operation, a write operation, and an execute operation.

17. The NAS apparatus of claim 16, wherein in C), the at least one processor reconfigures the first privacy setting for the first LSA share from private access with WAA permissions to private access with WACO permissions by:
reconfiguring the first network file system protocol for the NAS apparatus to generate, when a new object of the first plurality of objects is created on the first LSA share, the ACL for the new object such that the initial object permissions of the ACL permit:
a read operation, a write operation, and an execute operation on the new object for the object creator; and
a read operation and an execute operation and not a write operation on the new object for other private share users of the at least one private share user.

* * * * *